United States Patent
Dowaki et al.

(10) Patent No.: US 10,148,898 B2
(45) Date of Patent: *Dec. 4, 2018

(54) IMAGE SENSOR DRIVING APPARATUS, METHOD AND RADIATION IMAGING APPARATUS

(71) Applicant: CANON KABUSHIKI KAISHA, Tokyo (JP)

(72) Inventors: Kanako Dowaki, Tokyo (JP); Yuichi Naito, Yokohama (JP); Kazumasa Matsumoto, Yokohama (JP); Takashi Yamazaki, Asaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 15/281,448

(22) Filed: Sep. 30, 2016

(65) Prior Publication Data

US 2017/0019617 A1    Jan. 19, 2017

Related U.S. Application Data

(62) Division of application No. 13/948,699, filed on Jul. 23, 2013, now Pat. No. 9,756,267.

(30) Foreign Application Priority Data

Jul. 31, 2012    (JP) .................................. 2012-170381

(51) Int. Cl.
*H04N 5/357*    (2011.01)
*H04N 5/32*    (2006.01)
(Continued)

(52) U.S. Cl.
CPC .......... *H04N 5/357* (2013.01); *H04N 5/2173* (2013.01); *H04N 5/32* (2013.01); *H04N 5/363* (2013.01); *H04N 5/3653* (2013.01); *H04N 5/378* (2013.01)

(58) Field of Classification Search
CPC ...................................................... H04N 5/357
(Continued)

(56) References Cited

U.S. PATENT DOCUMENTS 6,855,937 B2    2/2005    Tashiro et al. ........... 250/370.11
6,937,279 B1    8/2005    Kim et al. .................... 348/308
(Continued)

FOREIGN PATENT DOCUMENTS

EP    0967729 A2    12/2009
JP    2002-026302    1/2002
(Continued)

OTHER PUBLICATIONS

European Extended Search Report dated Jun. 22, 2017 in counterpart application No. 13178416.7.
(Continued)

*Primary Examiner* — Joel W Fosselman
(74) *Attorney, Agent, or Firm* — Fitzpatrick Cella Harper and Scinto

(57) ABSTRACT

An image sensor driving apparatus extracts an image signal from an image sensor including a plurality of photoelectric conversion elements two-dimensionally arrayed, and includes a conversion unit which converts the image signal into digital data by performing offset correction for the image signal. The apparatus obtains digital data corresponding to a first sampling count by causing the conversion unit to process a reference voltage signal in accordance with a synchronization signal which determines an imaging frame rate, and obtains digital data corresponding to a second (Continued)

sampling count by causing the conversion unit to process a reference voltage signal every time extracting an image signal from a photoelectric conversion element group obtained by dividing a plurality of photoelectric conversion elements. The apparatus generates a correction value used for offset correction based on the obtained digital data corresponding to the first and second sampling counts.

18 Claims, 24 Drawing Sheets

(51) Int. Cl.
  *H04N 5/365*    (2011.01)
  *H04N 5/217*    (2011.01)
  *H04N 5/378*    (2011.01)
  *H04N 5/363*    (2011.01)

(58) Field of Classification Search
  USPC .......................................................... 348/294
  See application file for complete search history.

(56) References Cited

U.S. PATENT DOCUMENTS

| | | |
|---|---|---|
| 8,861,041 B2 | 10/2014 | Nagase .......................... 358/463 |
| 2005/0062855 A1 | 3/2005 | Tani et al. .................. 348/222.1 |
| 2008/0218615 A1 | 9/2008 | Huang et al. ................. 348/294 |
| 2008/0309804 A1 | 12/2008 | Huang .......................... 348/294 |
| 2010/0303323 A1 | 12/2010 | Matsumoto ................... 382/131 |
| 2012/0104267 A1 | 5/2012 | Matsumoto et al. .... 250/370.08 |
| 2012/0127356 A1 | 5/2012 | Matsuura ...................... 348/313 |
| 2014/0037056 A1 | 2/2014 | Naito et al. .................. 379/98.8 |
| 2014/0124668 A1 | 5/2014 | Ikawa et al. ............... 250/336.1 |

FOREIGN PATENT DOCUMENTS

| | | |
|---|---|---|
| JP | 2002-344809 | 11/2002 |
| JP | 2010-200299 | 11/2006 |
| JP | 2010-520709 | 6/2010 |

OTHER PUBLICATIONS

JPO Office Action dated Jul. 15, 2016 in counterpart Japanese patent application 2012-170381, with translation.

F I G. 20
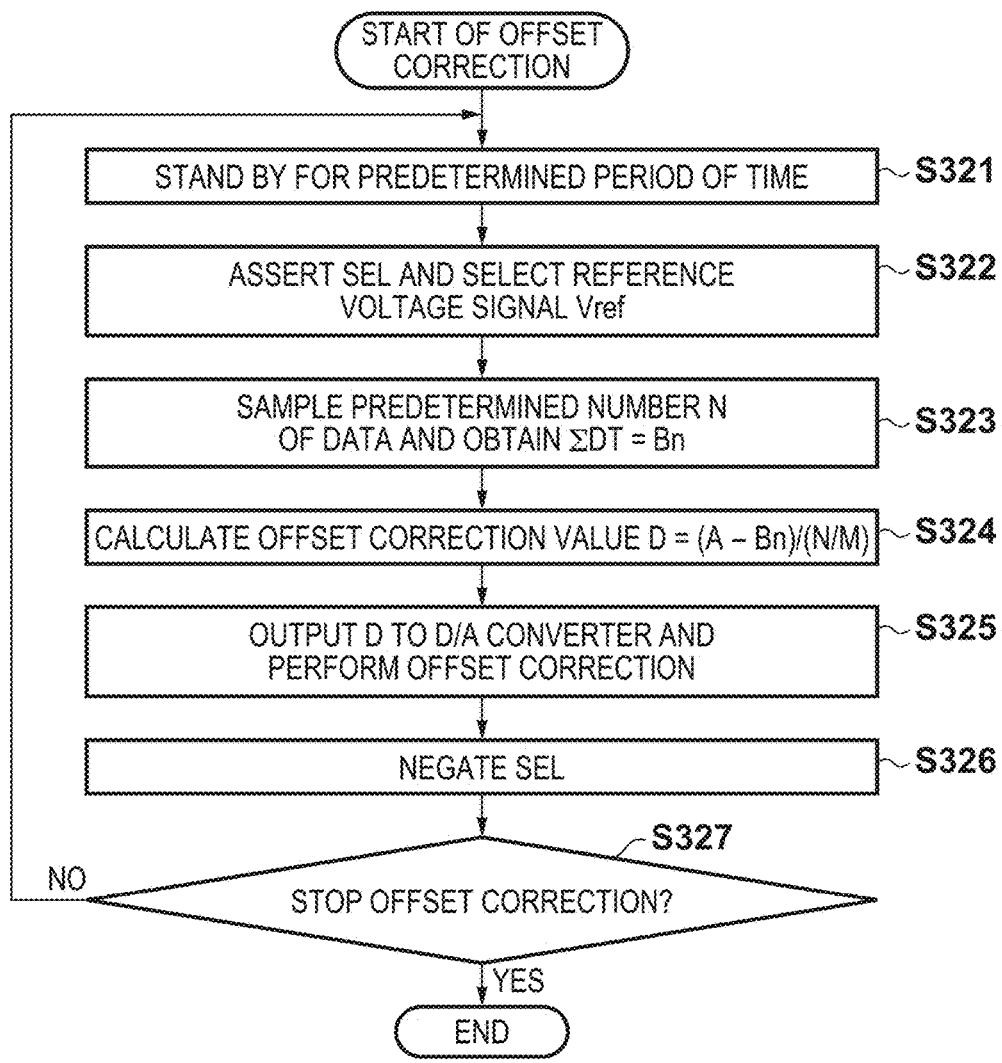

IMAGE SENSOR DRIVING APPARATUS, METHOD AND RADIATION IMAGING APPARATUS

RELATED APPLICATIONS

This application claims the benefit of Japanese Patent Application No. 2012-170381, filed Jul. 31, 2012, and claims benefit of parent application Ser. No. 13/948,699, filed Jul. 23, 2013, the entire contents of both of which applications are incorporated herein by reference.

BACKGROUND OF THE INVENTION

Field of the Invention

The present invention relates to an image sensor driving apparatus and method, and a radiation imaging apparatus using the image sensor driving apparatus.

Description of the Related Art

Recently, in the field of digital X-ray imaging apparatuses, instead of an image intensifier, a large-area flat panel radiation imaging apparatus based on a 1× optical system using photoelectric conversion elements has been widely used for the purpose of increasing resolution, decreasing the volume of the imaging apparatus, and suppressing image distortion. As one of 1× optical system flat panel sensors used in radiation imaging apparatuses, there is available a large-area flat panel sensor formed by two-dimensionally joining photoelectric conversion elements formed on a silicon semiconductor wafer by a CMOS semiconductor manufacturing process.

Since photoelectric conversion elements are formed on a silicon semiconductor wafer, the size of a flat panel sensor is limited to the size of the silicon semiconductor wafer. Japanese Patent Laid-Open No. 2002-026302 has proposed a technique for implementing the imaging area of a large-area flat panel sensor which is larger in size than a silicon semiconductor wafer. This patent literature discloses a manufacturing method for forming a large-area flat panel sensor by tiling a plurality of rectangular semiconductor substrates which are rectangular image sensors obtained by cutting photoelectric conversion elements in the form of strips from a silicon semiconductor wafer.

In addition, Japanese Patent Laid-Open No. 2002-344809 discloses the circuit arrangement for each rectangular semiconductor substrate obtained by cutting out photoelectric conversion elements in the form of strips. On each of the rectangular semiconductor substrates cut out in the form of strips, vertical and horizontal shift registers acting as readout control circuits are arranged together with two-dimensionally arrayed photoelectric conversion elements. External terminals (electrode pads) are provided near the horizontal shift register. According to this arrangement, control signals and clock signals input from the external terminals control the vertical and horizontal shift registers on each rectangular semiconductor substrate to cause the respective shift registers to sequentially output the respective pixel arrays in synchronism with the clock signals.

It is, however, generally known that the above rectangular semiconductor substrates and semiconductor devices such as differential amplifiers and A/D converters generate shot noise, thermal noise, and 1/f (flicker) noise. In the semiconductors manufactured by a MOS process, 1/f noise is dominant in low-frequency regions. In a radiation imaging apparatus formed by tiling a plurality of rectangular semiconductor substrates, since such 1/f noise is superimposed on digital image data for each block having undergone A/D conversion by a plurality of A/D converters, block artifacts are generated.

If no 1/f noise is generated in a dark image obtained without any emission of radiation, the dark image having undergone FPN (fixed pattern noise) correction, a very flat image like that shown in FIG. 24A can be obtained. If, however, low-frequency 1/f noise is generated in rectangular semiconductor substrates, differential amplifiers, and A/D converters, a block artifact appears on an A/D converter basis, as shown in FIG. 24B. Since a radiation imaging apparatus is required to have a wide dynamic range, in particular, it is important for the readout circuit used in the radiation imaging apparatus to have low noise characteristics.

SUMMARY OF THE INVENTION

One of the embodiments provides an imaging apparatus which reduces artifacts due to 1/f noise and to provide a method of driving such an apparatus.

According to one aspect of the present invention, there is provided an image sensor driving apparatus comprising: a scanning unit configured to extract an image signal from an image sensor having a plurality of photoelectric conversion elements two-dimensionally arrayed; a conversion unit configured to convert the image signal into digital data by performing offset correction for the image signal; a first obtainment unit configured to obtain digital data corresponding to a first sampling count by causing the conversion unit to process a reference voltage signal before the start of image signal readout operation from the plurality of photoelectric conversion elements by the scanning unit; a second obtainment unit configured to obtain digital data corresponding to a second sampling count by causing the conversion unit to process the reference voltage signal every time an image signal is extracted from a photoelectric conversion element group obtained by dividing the plurality of photoelectric conversion elements; and a generation unit configured to generate a correction value used for the offset correction based on digital data obtained by the first obtainment unit and the second obtainment unit.

Also, according to another aspect of the present invention, there is provided an image sensor driving apparatus comprising: an image sensor which includes a plurality of photoelectric conversion elements two-dimensionally arrayed, with a region corresponding to a photoelectric conversion element group as part of the plurality of photoelectric conversion elements being light-shielded; a scanning unit configured to extract an image signal from the image sensor; a conversion unit configured to convert the image signal into digital data by performing offset correction to the image signal; an obtainment unit configured to obtain digital data corresponding to a predetermined sampling count by causing the conversion unit to process an image signal read out from a photoelectric conversion element group in the light-shielded region in accordance with a synchronization signal which determines an imaging frame rate; and a generating unit configured to generate a correction value used for the offset correction based on digital data obtained by the obtainment unit.

Also, according to another aspect of the present invention, there is provided an image sensor driving apparatus comprising: a scanning unit configured to extract an image signal from an image sensor including a plurality of photoelectric conversion elements two-dimensionally arrayed; a conversion unit configured to convert the image signal into digital data by performing offset correction for the image signal; a first obtainment unit configured to obtain digital data corresponding to a first sampling count by causing the conversion unit to process a reference voltage signal; and a generation unit configured to generate a correction value used for the offset correction based on digital data obtained by causing the first obtainment unit to obtain digital data at predetermined time intervals in a period except for a period during which the scanning unit extracts an image signal.

Also, according to another aspect of the present invention, there is provided a radiation imaging apparatus comprising an above-described image sensor driving apparatus.

Also, according to another aspect of the present invention, there is provided a radiation imaging apparatus comprising: a detection unit including a plurality of pixels in a matrix which convert radiation or light into electric charge and output an analog electrical signal based on the electric charge; a readout unit configured to output one of a pixel signal and a reference signal based on an analog electrical signal obtained from the plurality of pixels; a calculation unit configured to calculate a difference between a value obtained from the reference signal and a predetermined reference value during a period until the readout circuit reads out the pixel signal corresponding to one line and reads out the pixel signal corresponding to a next one line; and a correction unit configured to correct a pixel signal corresponding to one line of the object based on the difference.

Also, according to another aspect of the present invention, there is provided a radiation imaging apparatus comprising: a detection unit including a plurality of pixels in a matrix which convert radiation into electric charge and output an analog electrical signal based on the electric charge; a readout unit configured to output one of a pixel signal and a reference signal based on an analog electrical signal obtained from a plurality of pixels; an A/D conversion unit configured to convert the pixel signal and the reference signal output from the readout unit into digital values; and a correction unit configured to correct a pixel signal corresponding to a pixel on a second row, based on a value of the reference signal obtained from the A/D conversion unit before a start of output of the pixel signal corresponding to the frame image and a value of the reference signal obtained from the A/D converter during a period between an end of output of a pixel signal corresponding to a first row of the detection unit in the frame image and a start of output of a pixel signal corresponding to the succeeding second row.

Also, according to another aspect of the present invention, there is provided an image sensor driving method of driving an image sensor including a plurality of photoelectric conversion elements two-dimensionally arrayed, the method comprising: a scanning step of extracting an image signal from the image sensor; a conversion step of converting the image signal into digital data by performing offset correction for the image signal; a first obtainment step of obtaining digital data corresponding to a first sampling count by processing a reference voltage signal in the conversion step before the scanning step; a second obtainment step of obtaining digital data corresponding to a second sampling count by processing the reference voltage signal in the conversion step every time an image signal is extracted from a photoelectric conversion element group obtained by dividing the plurality of photoelectric conversion elements in the scanning step; and a generation step of generating a correction value used for the offset correction based on digital data obtained in the first obtainment step and the second obtainment step.

Also, according to another aspect of the present invention, there is provided an image sensor driving method of driving an image sensor including a plurality of photoelectric conversion elements two-dimensionally arrayed, with a region corresponding to a photoelectric conversion element group as part of the plurality of photoelectric conversion elements being light-shielded, the method comprising: a scanning step of extracting an image signal from the image sensor; a conversion step of converting the image signal into digital data by performing offset correction to the image signal; an obtainment step of obtaining digital data corresponding to a predetermined sampling count by processing an image signal read out from a photoelectric conversion element group in the light-shielded region in the conversion step in accordance with a synchronization signal which determines an imaging frame rate; and a generation step of generating a correction value used for the offset correction based on digital data obtained in the obtainment step.

Also, according to another aspect of the present invention, there is provided an image sensor driving method of driving an image sensor including a plurality of photoelectric conversion elements two-dimensionally arrayed, the method comprising: a scanning step of extracting an image signal from the image sensor including a plurality of photoelectric conversion elements two-dimensionally arrayed; a conversion step of converting the image signal into digital data by performing offset correction for the image signal; a first obtainment step of obtaining digital data corresponding to a first sampling count by causing the conversion step to process a reference voltage signal; and a generation step of generating a correction value used for the offset correction based on digital data obtained by executing a first obtainment step at predetermined time intervals in a period except for a period during which an image signal is extracted in the scanning step.

Further features of the present invention will become apparent from the following description of exemplary embodiments with reference to the attached drawings.

BRIEF DESCRIPTION OF THE DRAWINGS

FIG. 20 is a flowchart showing offset correcting operation according to the fifth embodiment;

DESCRIPTION OF THE EMBODIMENTS

Preferred embodiments of the present invention will be described below with reference to the accompanying drawings. Although an arrangement in which an image sensor driving apparatus of the present invention is applied to a radiation imaging (moving image) system will be described below, the present invention is not limited to this.

First Embodiment

Figure 1:
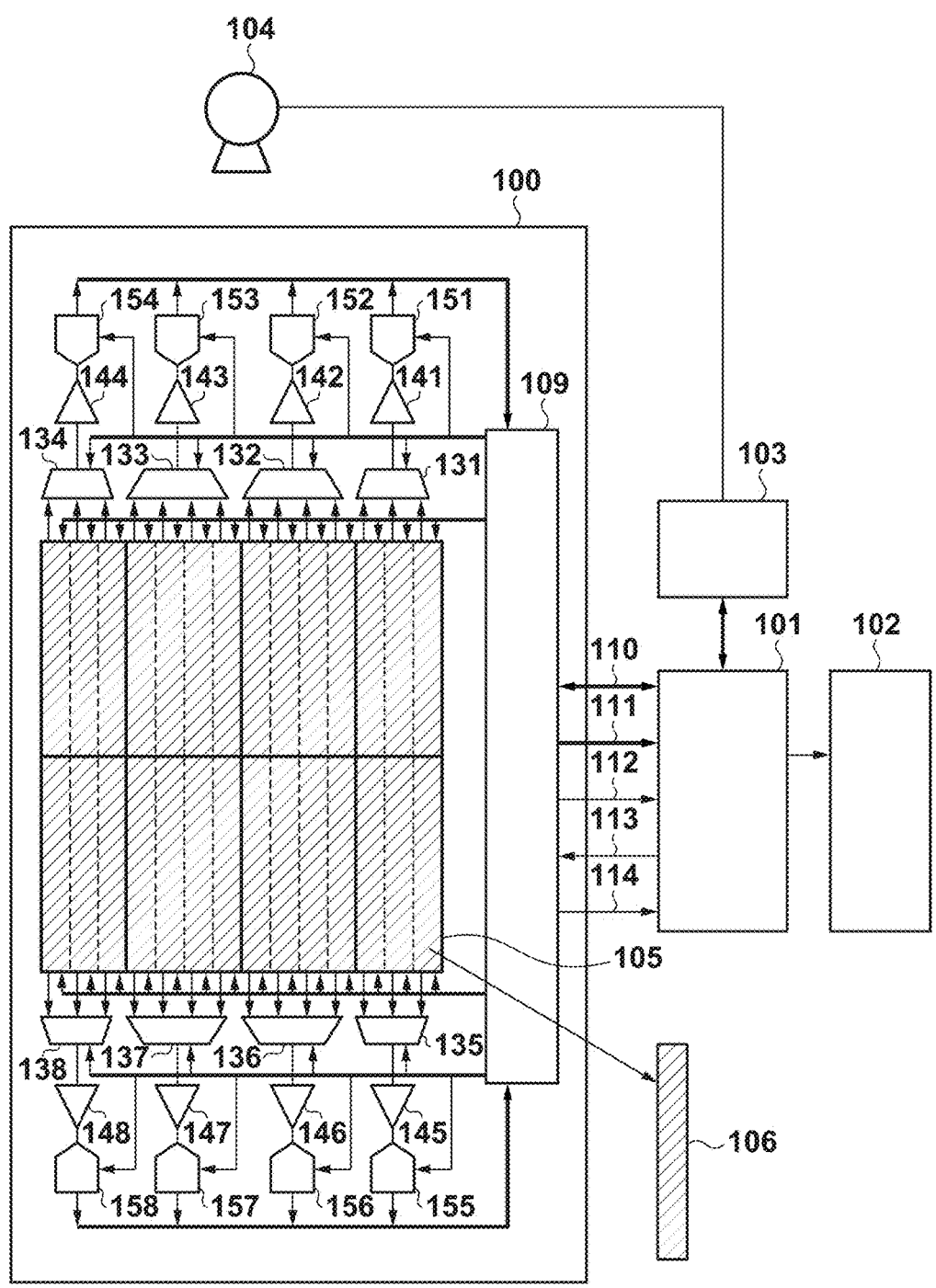
FIG. 1 is a block diagram showing a radiation moving image apparatus system according to the first embodiment.

FIG. 1 is a block diagram showing an example of the arrangement of an imaging system including a radiation imaging apparatus according to the first embodiment. FIG. 1 schematically shows the overall arrangement of the large-area flat panel radiation moving image capturing apparatus. Referring to FIG. 1, reference numeral 100 denotes a radiation imaging apparatus; 101, a system control apparatus including an image processing unit; 102, an image display device; 103, a radiation generation apparatus; and 104, a radiation source. In the imaging system shown in FIG. 1, the system control apparatus 101 synchronously controls the radiation imaging apparatus 100 and the radiation generation apparatus 103 at the time of imaging operation.

A scintillator (not shown) converts the radiation emitted from the radiation source 104 and transmitted through an object into visible light, which is then photoelectrically converted. An electrical signal corresponding to the amount of light after the photoelectric conversion is analog/digital-converted (A/D-converted). The radiation imaging apparatus 100 then transfers the A/D-converted signal as frame image data to an image processing unit in the system control apparatus 101. The system control apparatus 101 performs image processing of the frame image data and then causes the image display device 102 to display the radiation image in real time. Note that this embodiment will exemplify the radiation imaging apparatus 100 as an X-ray detector.

The radiation imaging apparatus 100 includes a flat panel sensor 105. The flat panel sensor 105 includes a plurality of two-dimensionally arranged pixel circuits each including a photoelectric conversion element and a sample/hold circuit which samples and holds a signal from the photoelectric conversion element. The flat panel sensor 105 is formed by tiling, on a flat base (not shown), rectangular semiconductor substrates 106 into a matrix, which are cut from a silicon semiconductor wafer and on which CMOS (complementary metal-oxide semiconductor) image sensors as photoelectric conversion elements are formed.

Each rectangular semiconductor substrate 106 can be used as a joining area sensor and includes a plurality of CMOS image sensors two-dimensionally arranged at a constant pitch. The flat panel sensor 105 and the above scintillator (not shown) constitute an X-ray image sensor which obtains an image by detecting X-rays. The rectangular semiconductor substrates 106 adjacent to each other on the flat base are tiled such that the pitch of the photoelectric conversion elements arranged side by side through the boundaries between the rectangular semiconductor substrates is the same as on the pitch of the photoelectric conversion elements on the rectangular semiconductor substrates 106. FIG. 1 shows an example of tiling the rectangular semiconductor substrates 106 into a 14 column×2 row matrix. However, the present invention is not limited to this, and the numbers of rectangular semiconductor substrates 106 to be tiled in the row and column directions are arbitrary.

The upper and lower side portions of the flat panel sensor 105 are provided with external terminals (electrode pads) (not shown) of the rectangular semiconductor substrates 106 arranged in the matrix. The electrode pads of the rectangular semiconductor substrates 106 are connected to external circuits through flying lead type printed circuit boards (not shown). Reference numerals 131 to 138 denote analog multiplexers which select pixel outputs from the plurality of connected rectangular semiconductor substrates 106 in accordance with control signals from an imaging control unit 109. The analog multiplexers then output the selected pixel outputs to differential amplifiers 141 to 148 respectively connected to the analog multiplexers. Reference numerals 151 to 158 denote A/D converters which convert analog signals from the differential amplifiers 141 to 148, the latter being respectively connected to the A/D converters, into digital signals and output them to the imaging control unit 109 in accordance with synchronization clocks output from the imaging control unit 109. The imaging control unit 109 combines digital image data for the respective blocks A/D-converted by the A/D converters 151 to 158 into frame data, and transfers it to the image processing unit of the system control apparatus 101.

The imaging control unit 109 performs control command communication and synchronization signal communication with the system control apparatus 101 and transmits image data to the image processing unit in the system control apparatus 101. The imaging control unit 109 also has a function of controlling the flat panel sensor 105, and performs driving control and imaging mode control on the flat panel sensor 105. That is, the imaging control unit 109, the analog multiplexers 131 to 138, the differential amplifiers 141 to 148, and the A/D converters 151 to 158 constitute an image sensor driving apparatus for the plurality of rectangular semiconductor substrates 106 constituting the flat panel sensor 105.

Reference numeral 110 denotes a command control interface via which the system control apparatus 101 communicates the setting of an imaging mode, the setting of various types of parameters, the setting of the start of imaging, the setting of the end of imaging, and the like to the imaging control unit 109. In addition, the imaging control unit 109 communicates the state and the like of the radiation imaging apparatus 100 to the system control apparatus 101 via the command control interface 110. Reference numeral 111 denotes an image data interface via which the imaging control unit 109 sends the image data obtained by imaging to the system control apparatus 101. 112 denotes a READY signal which is a signal with which the imaging control unit 109 informs the system control apparatus 101 that the radiation imaging apparatus 100 is ready for imaging. 113 denotes an external synchronization signal which is a signal with which the system control apparatus 101 notifies the imaging control unit 109 of the timing of radiation emission upon reception of the READY signal 112 from the imaging control unit 109. 114 denotes an emission permission signal. While the emission permission signal 114 is enabled, the system control apparatus 101 transmits an emission signal to the radiation generation apparatus 103. The flat panel sensor 105 accumulates the radiation emitted from the radiation source 104 as effective radiation and forms an X-ray image.

Figure 2:
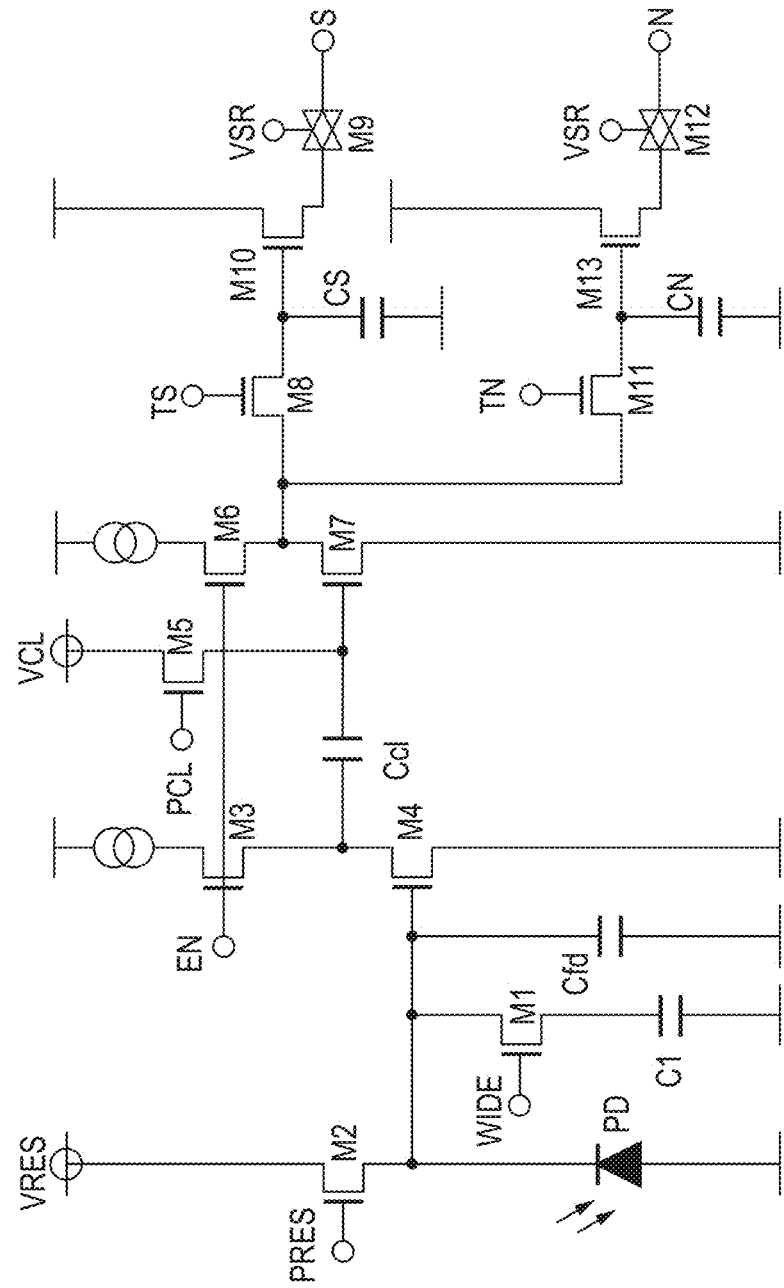
FIG. 2 is a circuit diagram showing a pixel circuit on a rectangular semiconductor substrate.

FIG. 2 shows an example of a pixel circuit corresponding to one pixel of the pixel circuits two-dimensionally arranged on the CMOS rectangular semiconductor substrates 106 used for tiling.

Referring to FIG. 2, reference symbol PD denotes a photodiode which performs photoelectric conversion; M2, a reset MOS transistor (reset switch) for removing the electric charge accumulated in the floating diffusion; Cfd, a floating diffusion (floating diffusion region) capacitor which accumulates electric charge; M1, a sensitivity switching MOS transistor (sensitivity switch) for switching between a high dynamic range mode and a high sensitivity mode; and C1, a capacitor for dynamic range enlargement, which becomes ready for electric charge accumulation when the sensitivity switch M1 is turned on. When the sensitivity switch M1 is turned on, the capacitance of the floating node portion substantially increases. As a consequence, the sensitivity decreases but the dynamic range can be enlarged. For example, therefore, when performing fluoroscopic imaging requiring high sensitivity, the sensitivity switch M1 is turned off, whereas when performing DSA (Digital Subtraction Angiography) imaging requiring a high dynamic range, the sensitivity switch M1 is turned on. Reference symbol M4 denotes an amplification MOS transistor (first pixel amplifier) which operates as a source-follower; and M3, a selection MOS transistor (first selection switch) for activating the first pixel amplifier M4.

The subsequent stage of the pixel amplifier M4 is provided with a clamping circuit for removing kTC noise generated by a photoelectric conversion unit. Reference symbol Ccl denotes a clamping capacitor; M5, a clamping MOS transistor (clamping switch); M7, an amplifying MOS transistor (second pixel amplifier) operating as a source-follower; and M6, a selection MOS transistor (second selection switch) for activating the second pixel amplifier M7.

The subsequent stage of the second pixel amplifier M7 is provided with two sample/hold circuits. Reference symbol M8 denotes a sample/hold MOS transistor (sample/hold switch S) which forms a sample/hold circuit for optical signal accumulation. CS denotes an optical signal hold capacitor; M11, a sample/hold MOS transistor (sample/hold switch N) which forms a noise signal accumulation sample/hold circuit. CN denotes a noise signal hold capacitor; M10, an optical signal amplifying MOS transistor (pixel amplifier S) which operates as a source-follower. M9 denotes an analog switch (transfer switch S) for outputting the optical signal amplified by the pixel amplifier S M10 to the S signal output line. M13 denotes a noise signal amplifying MOS transistor (pixel amplifier N) which operates as a source-follower; and M12 denotes an analog switch (transfer switch N) for outputting the noise signal amplified by the pixel amplifier N M13 to the N signal output line.

A signal EN is a control signal which is connected to the gates of the first selection switch M3 and second selection switch M6 to activate the first pixel amplifier M4 and the second pixel amplifier M7. When the signal EN is set at high level, the first pixel amplifier M4 and the second pixel amplifier M7 are simultaneously activated. A signal WIDE is connected to the gate of the sensitivity switch M1 to control sensitivity switching. When the signal WIDE is set at low level, the sensitivity switch is turned off to set the high sensitivity mode. A signal PRES is a reset signal for turning on the reset switch M2 to apply the reference voltage VRES to the photodiode PD and remove accumulated electric charge. A signal PCL is a signal for controlling the clamping switch M5. When the signal PCL is set at high level, the clamping switch M5 is turned on to set the clamping capacitor Ccl at a reference voltage VCL (clamping voltage).

A signal TS is a sample/hold control signal for controlling a sample/hold circuit for an optical signal. Setting the signal TS at high level to turn on the sample/hold switch S M8 will collectively transfer the optical signal to the capacitor CS via the second pixel amplifier M7. Subsequently, setting the signal TS at low level at once for all the pixels to turn off the sample switch S M8 will stop holding optical signal charge in the sample/hold circuit. A signal TN is a sample/hold control signal for controlling a sample/hold circuit for a noise signal. Setting the signal TN at high level to turn on the sample/hold switch N M11 will collectively transfer the noise signal to the capacitor CN via the second pixel amplifier M7. Setting the signal TN at low level at once for all the pixels to turn off the sample switch N M11 will stop holding noise signal charge in the sample/hold circuit. After sampling/holding of the capacitors CS and CN, the sample/hold switch S M8 and the sample/hold switch N M11 are turned off to disconnect the capacitors CS and CN from the accumulation circuit on the preceding stage. This makes it possible to non-destructively read out optical signals accumulated until they are sampled and held again.

A signal VSR is a control signal for reading out the optical and the noise signal from the pixel circuit. The signal VSR is applied to switches M9 and M12 for turning on and off. The optical signal outputs from the capacitor CS to column signal lines 306. The noise signal outputs from the capacitor CN to column signal lines 307. The switches M9 and M11 are corresponding to switches 310 in FIG. 3.

Figure 3:
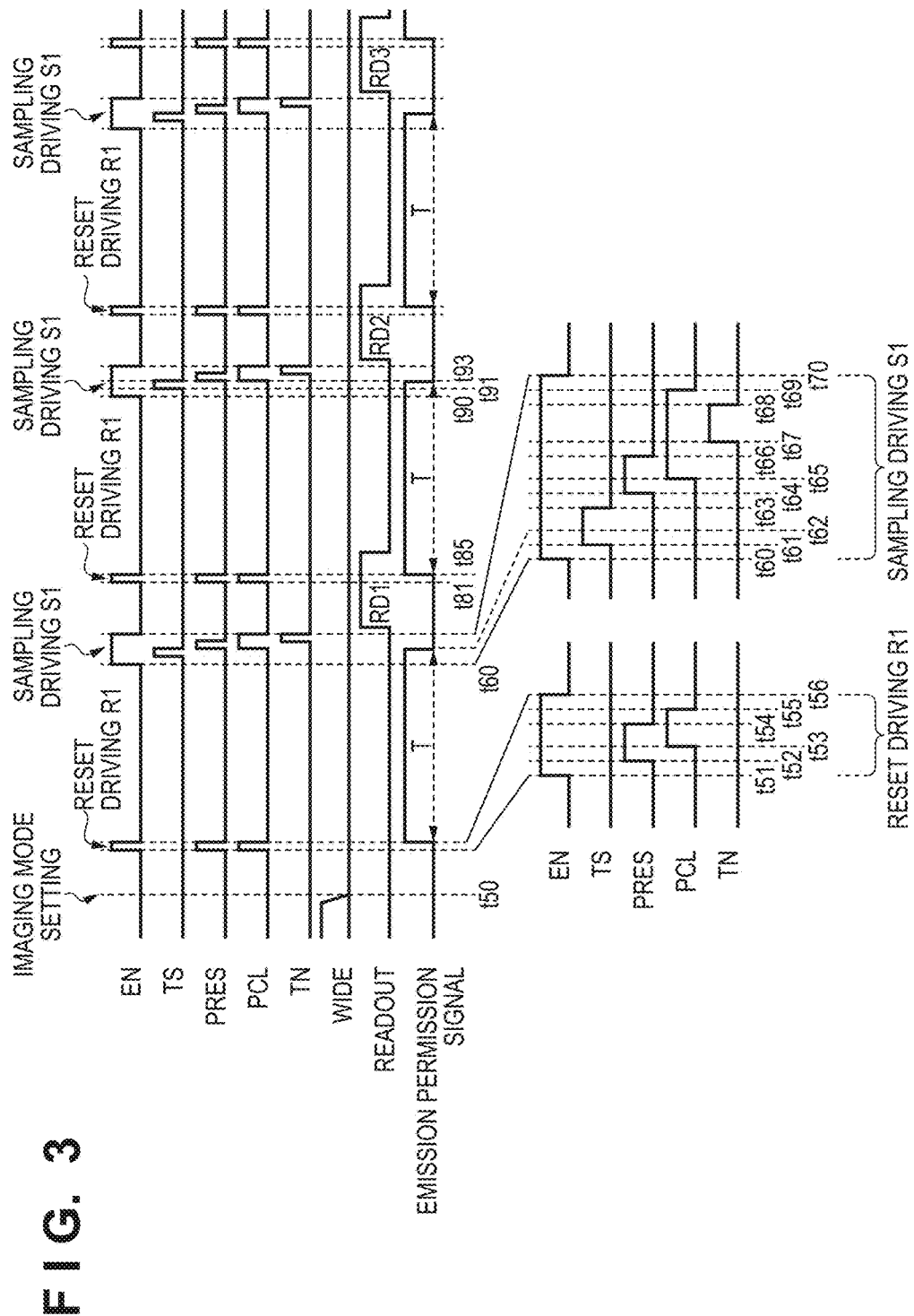
FIG. 3 is a timing chart showing an example of driving control at the time of moving image capturing by the pixel circuit in FIG. 2.

FIG. 3 is a timing chart showing the driving timing when performing moving image capturing at a fixed frame rate with X-ray window limitation in the pixel circuit shown in FIG. 2. The timing of control signals until the optical signal hold capacitor CS and the noise signal hold capacitor CN sample and hold electric charge at the time of moving image capturing will be described with reference to FIG. 3.

In the timing chart of FIG. 3, the apparatus sets an imaging mode at t50, and starts driving operation for imaging at t51. Reset driving R1 which starts at t51 will be described. Reset driving R1 is the driving operation of performing resetting and clamping, which is executed under the control of the imaging control unit 109. First of all, at t51, the imaging control unit 109 sets the signal EN at high level to turn on the switches M3 and M6, thereby activating the first pixel amplifier M4 and the second pixel amplifier M7. At t52, the imaging control unit 109 then sets the signal PRES at high level to turn on the reset switch M2 to apply a reference voltage VRES to the photodiode PD and the floating diffusion capacitor Cfd. This resets the sensor. At t53, the imaging control unit 109 sets the signal PCL at high level to turn on the clamping switch M5. This applies the reference voltage VCL to the second pixel amplifier M7 side of the clamping capacitor Ccl. At t54, the imaging control unit 109 sets the signal PRES at low level to turn off the reset switch M2 to complete resetting. This sets a reset voltage on the first pixel amplifier M4 side of the clamping capacitor Ccl. At t55, the imaging control unit 109 sets the signal PCL at low level. This turns off the clamping switch M5 to accumulate, in the clamping capacitor Ccl, electric charge corresponding to the difference between the reference voltage VCL and the reference voltage VRES, thereby completing clamping.

Upon completion of reset driving R1, the photodiode PD and the photoelectric conversion unit of the floating diffusion capacitor Cfd start accumulation from t55. At t56, the apparatus sets the signal EN at low level to deactivate the first pixel amplifier M4 and the second pixel amplifier M7. With the above operation, the flat panel sensor 105 is set in an accumulation state, and hence the apparatus enables an emission permission signal at t56 to request the emission of X-rays. The apparatus controls the subsequent reset driving according to this timing.

The tiled rectangular semiconductor substrates 106 are configured to collectively perform reset driving for all the pixels of the respective tiled imaging elements at the same timing in the same period so as to prevent image misregistration caused by temporal switching offsets between imaging elements and scanning lines at the time of moving image capturing. Thereafter, the apparatus performs accumulation by one-shot exposure to collectively accumulate, in the capacitor Cfd, photocharge generated by the photodiode PD in each pixel circuit. Note that reset noise (kTC noise) is generated in the photoelectric conversion unit during the application of the reference voltage VRES to the photodiode PD in reset driving operation from t52 to t54. The apparatus removes this reset noise by setting the reference voltage VCL on the second pixel amplifier M7 side of the clamping capacitor Ccl of the clamping circuit.

Sampling driving S1 which starts at t60 will be described next. At t60, the imaging control unit 109 sets the signal EN at high level to turn on the first selection switch M3 and the second selection switch M6. This converts the electric charge accumulated in the capacitor Cfd into a voltage and outputs the voltage from the first pixel amplifier M4, which operates as a source-follower, to the clamping capacitor Ccl. The output from the first pixel amplifier M4 includes reset noise. Since the second pixel amplifier M7 side is set to the reference voltage VCL at the time of resetting by the clamping circuit, the signal output is output, as an optical signal from which the reset noise is removed, to the second pixel amplifier M7. At t61, the imaging control unit 109 then sets the sample/hold control signal TS at high level to turn on the sample/hold switch S M8, thereby collectively transferring the optical signal to the optical signal hold capacitor CS via the second pixel amplifier M7. At a time T from the start of the sample/hold operation (i.e. from the end of the reset operation), the imaging control unit 109 disables the emission permission signal to inhibit X-ray emission at t62.

At t63, the imaging control unit 109 sets the signal TS at low level to turn off the sample/hold switch S M8, thereby sampling and holding photocharge signals in the optical signal hold capacitor CS. At t64, the imaging control unit 109 sets the reset signal PRES at high level to turn on the reset switch M2 so as to reset the capacitor Cfd to the reset voltage VRES (also known as a reference voltage to remove accumulated charge). That is, this resets the sensor. At t65, the imaging control unit 109 sets the signal PCL at high level. This accumulates, in the clamping capacitor Ccl, electric charge corresponding to the voltage difference between the clamping voltage VCL and the reset voltage VRES on which reset noise is superimposed. Thereafter, at time t66, the imaging control unit 109 sets the reset signal PRES at low level to complete resetting.

Subsequently, at t67, the imaging control unit 109 sets the signal TN at high level to turn on the sample/hold switch N M11, thereby transferring the noise signal generated when being set to the reference voltage VCL to the noise signal hold capacitor CN. At t68, the imaging control unit 109 then sets the signal TN at low level to turn off the sample/hold switch N M11, thereby sampling and holding a noise signal in the noise signal hold capacitor CN. Thereafter, the imaging control unit 109 sets the signal PCL at low level at t69 and sets the signal EN at low level at t70, thereby finishing sampling driving S1. The imaging control unit 109 collectively performs sampling driving S1 for all the pixels. The imaging control unit 109 controls the subsequent sampling driving according to this timing. After sampling driving S1, the imaging control unit 109 performs reset driving R1 again at t81, and starts accumulation in the photodiode PD in the next frame.

The apparatus scans optical and noise signals for each pixel. When the transfer switch S M9 is turned on, the voltage of the optical signal hold capacitor CS is transferred to an optical signal output line via the pixel amplifier S M10. Likewise, when the transfer switch N M12 is turned on, the voltage of the noise signal hold capacitor CN is transferred to a noise signal output line via the pixel amplifier N M13. The differential input amplifier (not shown) connected to the noise signal output line and the optical signal output line subtracts the signals transferred to the noise signal output signal and the optical signal output line. This removes thermal noise in the pixel amplifier, 1/f noise, and FPN due to temperature differences and process variations. Note that the time during which readout operation can be performed from the sensor corresponds to the period from the end time of sample/hold operation at t68 (TN off) to t91 (TS on) at which sample/hold operation for photocharge signals in the next frame starts with respect to the optical signal hold capacitor CS and the noise signal hold capacitor CN. After sampling driving S1, the apparatus performs pixel readout processing RD1. The apparatus performs readout processing immediately after sample/hold operation to shorten the delay to image display as much as possible.

In the pixel circuit in FIG. 2, the accumulation start timing of the photodiode PD corresponds to t55 or t69 at which the apparatus sets the signal PCL at low level to complete clamping after the completion of resetting shown in FIG. 3. The accumulation end timing corresponds to time t63 at which the apparatus sets the signal TS at low level to sample and hold an optical signal. The accumulation time is limited by inserting reset driving R1 between sampling driving S1 to sample and hold optical and noise signals and sampling driving S1. Referring to FIG. 3, inserting reset driving R1 which starts at t81 between sampling driving S1 which starts at t60 and sampling driving S1 which starts at t90 limits an X-ray window as the substantial accumulation time to a period T from t85 to t93.

Figure 4:
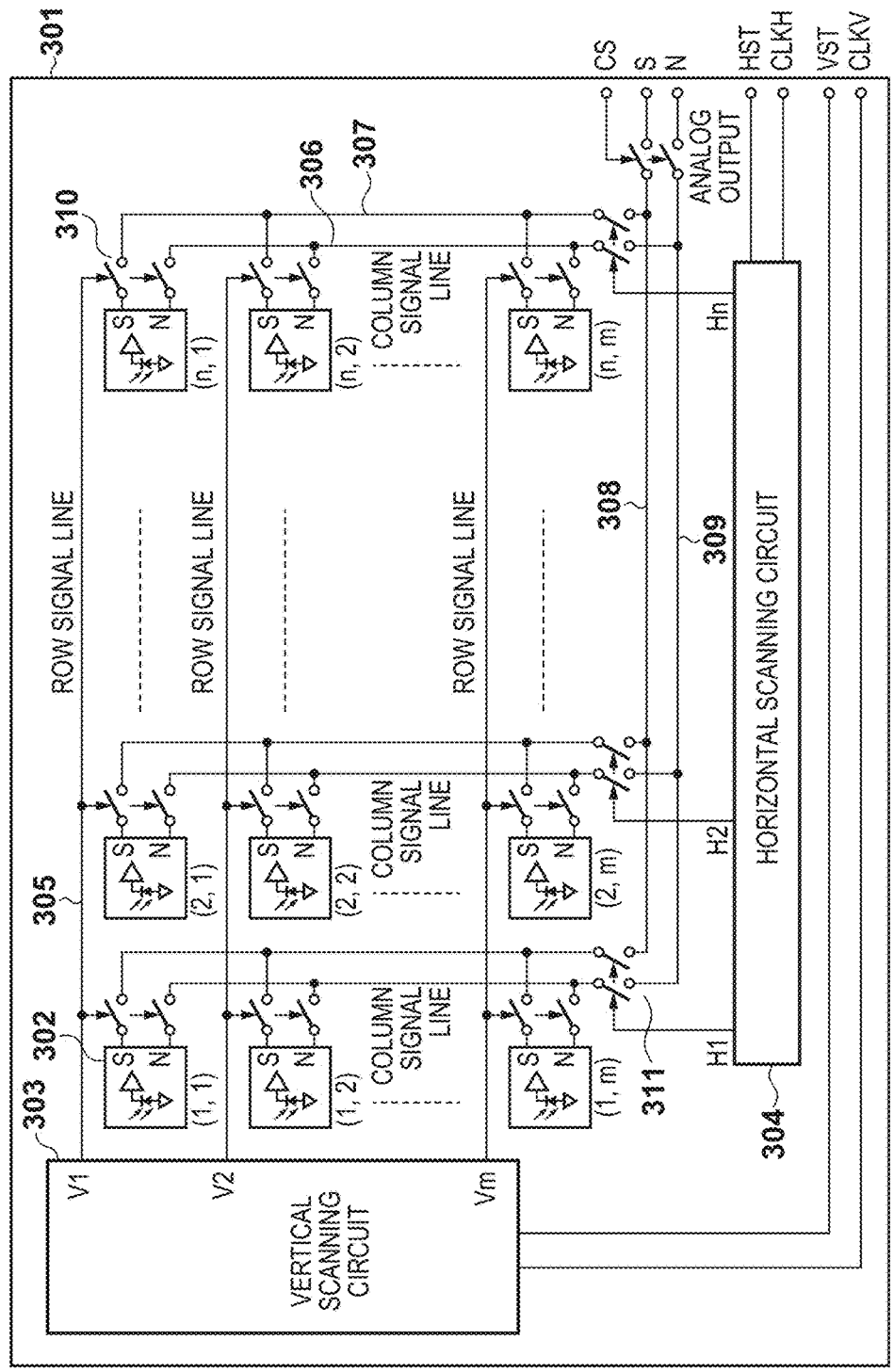
FIG. 4 is a block diagram showing an example of the internal structure of a rectangular semiconductor substrate according to the embodiment.

FIG. 4 is a block diagram schematically showing an example of the internal structure of the rectangular semiconductor substrate 106, labeled 301 in this embodiment. The rectangular semiconductor substrate 106 is an image sensor in which the pixel circuits shown in FIG. 2 which include photoelectric conversion elements are two-dimensionally arrayed. The rectangular semiconductor substrate 106 includes a chip selection terminal CS, an optical signal output terminal S, a noise signal output terminal N, a vertical scanning start signal terminal VST, a vertical scanning clock terminal CLKV, a horizontal scanning start signal terminal HST, and a horizontal scanning clock terminal CLKH. A vertical scanning circuit 303 selects a pixel group in the horizontal direction and sequentially scans the pixel group in the vertical direction as the sub-scanning direction in synchronism with a vertical scanning clock CLKV. A horizontal scanning circuit 304 sequentially selects column signal lines for the pixel group in the horizontal direction as the main scanning direction, which is selected by the vertical scanning circuit 303, pixel by pixel in synchronism with a horizontal scanning clock CLKH. A pixel circuit 302 is a pixel circuit shown in FIG. 2, which outputs an optical signal voltage signal S and a noise voltage signal N respectively sampled and held by column signal lines 306 and 307 by enabling a row signal line 305 as an output line of the vertical scanning circuit 303. The horizontal scanning circuit 304 sequentially selects the voltage signals output to the column signal lines 306 and 307 to sequentially output voltage signals originating from the respective pixels to analog output lines 308 and 309.

As described above, the rectangular semiconductor substrate 106 is configured to perform pixel selection by switching operation based on the X-Y address scheme using the vertical scanning circuit 303 and the horizontal scanning circuit 304 and output the voltage signals of the optical signal S and noise signal N originating from each selected pixel and amplified by the transistors to the analog output terminals S and N via the column signal lines 306 and 307 and the analog output line 308 and 309.

The chip selection signal terminal CS is a chip selection signal input terminal. Setting the chip selection signal at high level will output the optical voltage signal S and the noise voltage signal N obtained by the imaging element according to internal scanning from the analog output terminals S and N. An output switching analog switches 310, the column signal lines 307 and 306, and a switching transistor 311 which switches column signal lines based on outputs from the horizontal scanning circuit 304, which are located on the subsequent stage of the sample/hold circuit associated with optical and noise signals, constitute a readout scanning transmission circuit.

The vertical scanning clock terminal CLKV is a clock input terminal of the vertical scanning circuit 303. The vertical scanning start signal terminal VST is a start signal input terminal of the vertical scanning circuit 303. Inputting the vertical scanning clock CLKV after setting the vertical scanning start signal VST at high level will sequentially switch and enable row selection signals in the order of V1, V2, . . . , Vm. Upon starting vertical scanning, the apparatus sets the vertical scanning start signal VST at low level. The horizontal scanning clock terminal CLKH is a clock input terminal of the horizontal scanning circuit 304. The horizontal scanning start signal terminal HST is a start signal input terminal of the horizontal scanning circuit 304. Inputting the horizontal scanning clock CLKH after setting the horizontal scanning start signal HST at high level will sequentially switch and enable column selection signals in the order of H1, H2, . . . , Hn. Upon starting horizontal scanning, the apparatus sets the horizontal scanning start signal HST at low level.

Enabling the row signal line V1 of the vertical scanning circuit 303 will select a pixel group of (1, 1) to (n, 1) on one horizontal row connected to the row selection signal V1 and output the optical voltage signals N and the noise voltage signals S from the respective pixels on one horizontal row to the column signal lines 306 and 307. Sequentially switching and enabling column selection signals for the horizontal scanning circuit 304 in the order of H1, H2, . . . , Hn will output the optical voltage signals S and the noise voltage signals N from the pixels on one horizontal row to the analog output terminals S and N via the analog output lines 308 and 309. Performing horizontal scanning up to the row selection signal Vm in the same manner as described above will obtain pixel outputs from all the pixels.

Figure 5A:
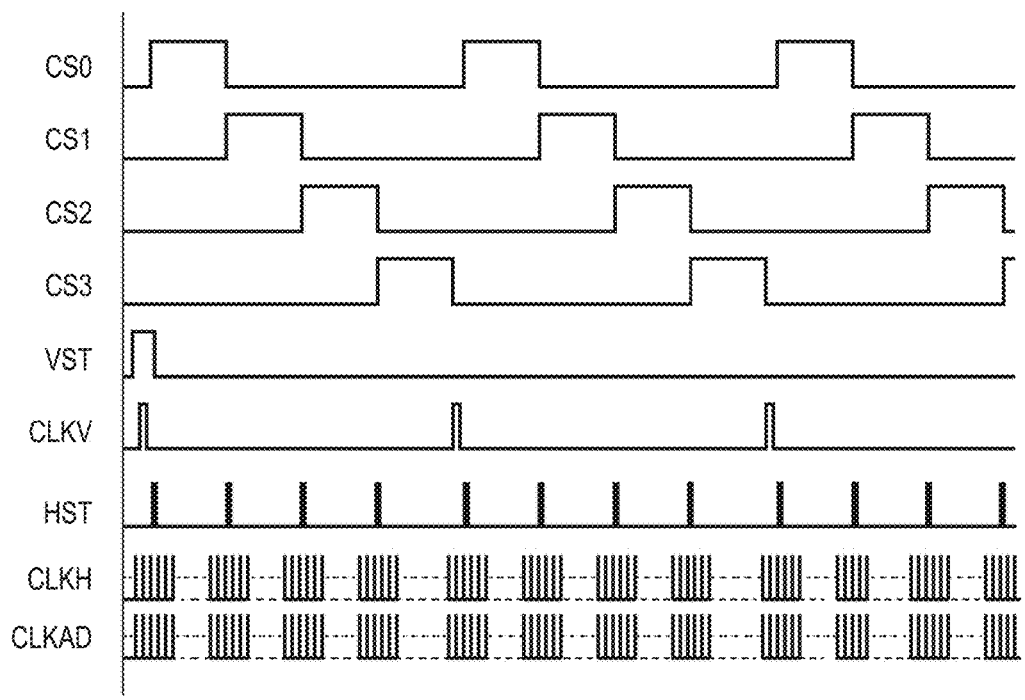
FIG. 5A is a timing chart showing control signals on the rectangular semiconductor substrates.

FIG. 5A is a timing chart for making data of one A/D converted, read-out pixel from four tiled rectangular semiconductor substrates.

Figure 5B:
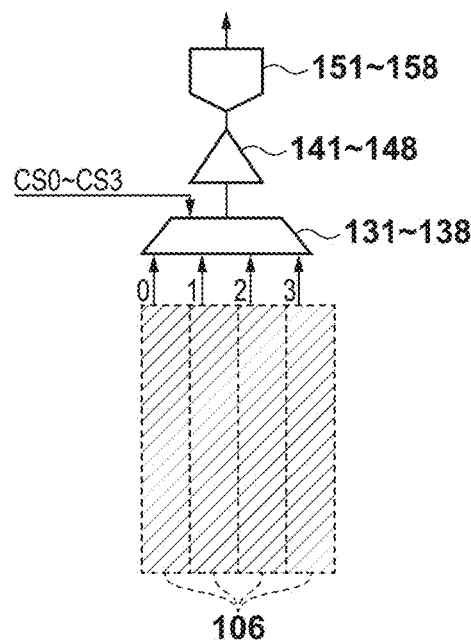
FIG. 5B is a view showing the arrangement of one A/D converter.

Signals CS0 to CS3 are chip selection signals for controlling the output of analog signals from the rectangular semiconductor substrates. FIG. 5B shows the arrangement of one A/D converter extracted from the arrangement in FIG. 1. The numbers assigned to analog output signals from the rectangular semiconductor substrates 106 one-to-one correspond to the numbers of the chip selection signals CS in the timing chart. For example, while the signal CS0 is at high level, an analog output of analog output signal number "0" is activated, and is output to a corresponding one of the differential amplifiers 141 to 148 on the next stage. When the signal CS1 is at high level, an analog output of analog output signal number "1" is activated, and is output to a corresponding one of the differential amplifiers 141 to 148 on the next stage. That is, the signal CS0 is connected to the rectangular semiconductor substrate 106 of analog output signal number "0". The signal CS1 is connected to the rectangular semiconductor substrate 106 of analog output signal number "1". Likewise, the signal CS2 is connected to the rectangular semiconductor substrate 106 of analog output signal number "2". The signal CS3 is connected to the rectangular semiconductor substrate 106 of analog output signal number "3".

In an image readout operation, the apparatus makes a chip selection CS0. When the vertical scanning clock CLKV rises while the vertical scanning start signal VST is at high level, the row signal line V1 of the vertical scanning circuit in FIG. 4 is enabled. This activates an output of the pixel group of (1, 1) to (n, 1) selected by the row signal line V1 to output pixel voltage signals from the respective pixels of the pixel group of (1, 1) to (n, 1) to a column signal line.

When the horizontal scanning clock CLKH rises while the horizontal scanning start signal HST is at high level, the column selection row signal H1 of the horizontal scanning circuit is enabled. In synchronism with leading edges of the signal CLKH, the column selection row signal of the horizontal scanning circuit is switched to H2, . . . , Hn to select pixels from (1, 1) to (n, 1), thereby completing scanning of the pixel group in the horizontal direction on the rectangular semiconductor substrate selected by the chip selection CS0 in the horizontal direction. Since the rectangular semiconductor substrates 106 sequentially output pixel outputs to the external analog output terminals in synchronism with the clocks CLKH, the A/D converters perform A/D conversion in response to A/D conversion clocks CLKAD synchronized with the clocks CLKH.

The apparatus then performs horizontal scanning in the same manner as described above upon switching the chip selection to CS1, and also performs horizontal scanning in the same manner as described above upon switching the chip selection to CS2, thereby completing readout of the pixel group arrayed on one horizontal line on the three rectangular semiconductor substrates. Subsequently, the apparatus performs horizontal scanning up to Vm while sequentially switching the row signal lines of the vertical scanning circuit in accordance with the clocks CLKV, thereby completing readout of all the pixels on the four rectangular semiconductor substrates.

Figure 6:
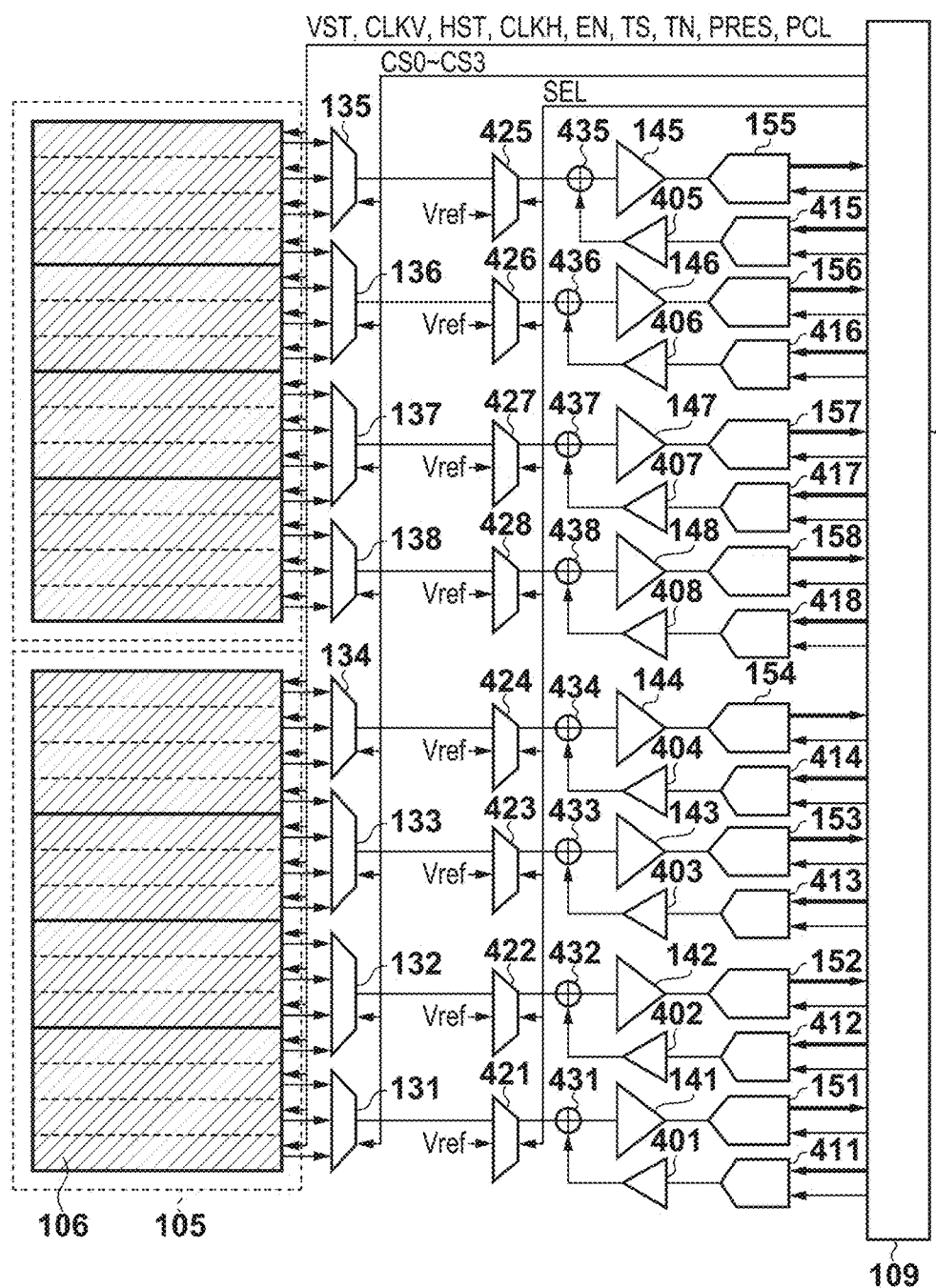
FIG. 6 is a block diagram showing a radiation imaging apparatus according to the first embodiment.
Figure 7:
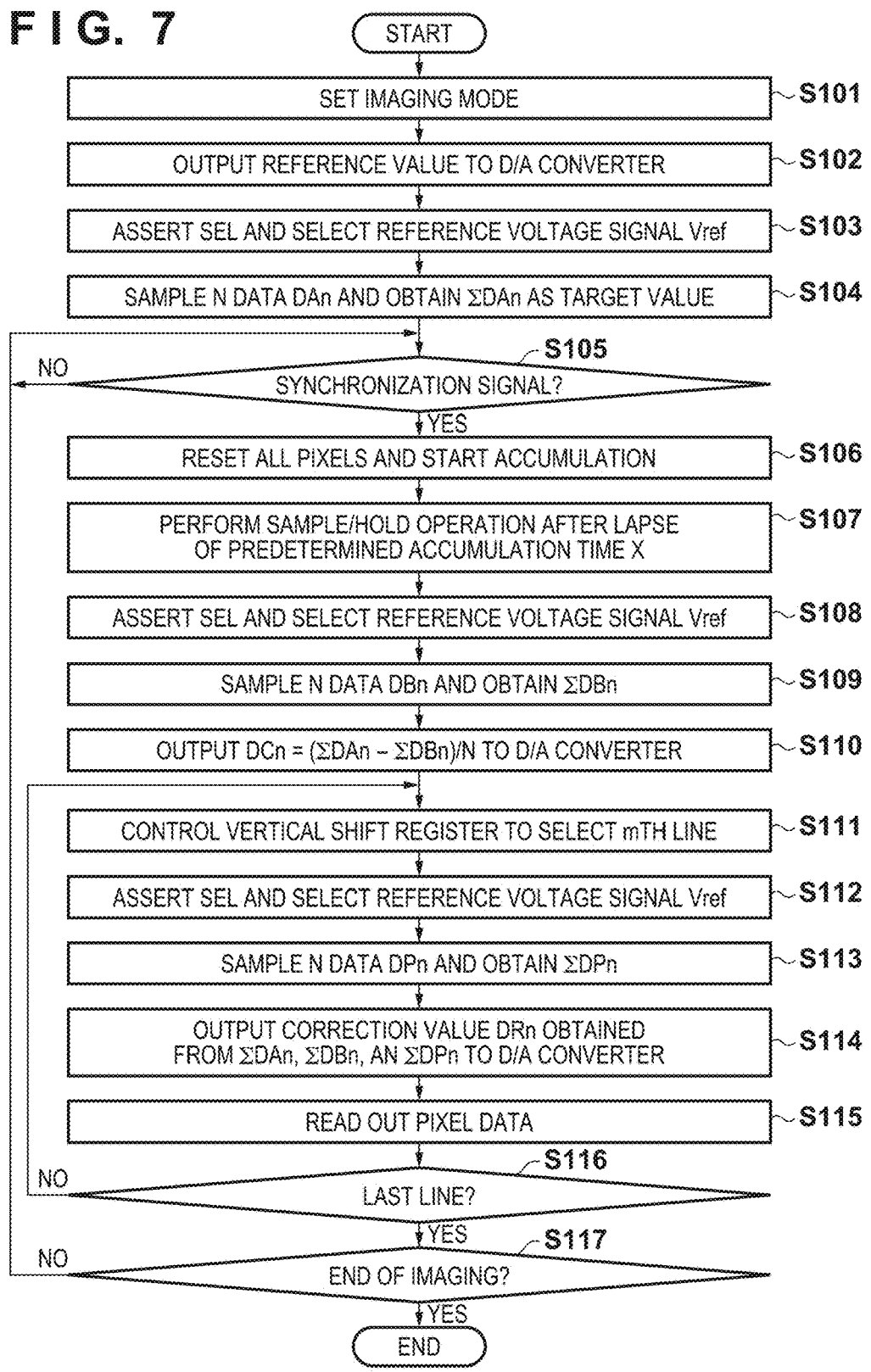
FIG. 7 is a flowchart showing rectangular semiconductor substrate control according to the first embodiment.

A method of correcting offsets due to 1/f noise generated in various types of semiconductor devices in real time according to the first embodiment will be described next with reference to the block diagram of FIG. 6 and the flowchart of FIG. 7. FIG. 6 is a block diagram showing an example of the arrangement of the image sensor driving apparatus according to the first embodiment. FIG. 7 is a flowchart showing driving control on the rectangular semiconductor substrates according to the first embodiment.

The operation of generating a target value for a target value of offset correction will be described first (steps S101 to S104). A target value is generated before imaging operation. Referring to FIG. 6, offset correction circuits constituted by multiplexers 421 to 428, D/A converters 411 to 418, and amplifiers 401 to 408 are added to the radiation imaging apparatus 100 shown in FIG. 1. As described above, the blocks respectively constituted by the analog multiplexers 131 to 138, the differential amplifiers 141 to 148, and the A/D converters 151 to 158 each select one of output signals from the rectangular semiconductor substrates 106 based on an instruction from the imaging control unit 109. The offset correction circuits are respectively added to these blocks. The multiplexers 421 to 428 select signals based on output signals from the analog multiplexers 131 to 138 and a reference voltage signal Vref as a predetermined voltage, in response to a switch signal SEL. The D/A converters 411 to 418 and the amplifiers 401 to 408 convert the offset correction data calculated by the imaging control unit 109 into analog signals. For the sake of easy recognition, FIG. 6 shows the rectangular semiconductor substrates 106 arrayed in the vertical direction. In practice, however, they are arranged in the manner shown in FIG. 1.

The imaging control unit 109 sets the imaging mode designated by the system control apparatus 101 (step S101). The imaging control unit 109 then outputs a reference value of ±0 to each of the D/A converters 411 to 418 to generate a target value for offset correction (step S102). The imaging control unit 109 then sets SEL at high level and controls the multiplexers 421 to 428 to output the reference voltage signals Vref (step S103). The differential amplifiers 141 to 148 to which signals S and N as analog outputs are input from the rectangular semiconductor substrates 106 have circuit arrangements configured to output predetermined voltages upon receiving signals of the same voltage. For this reason, when the multiplexers 421 to 428 start to output the reference voltage signals Vref, the differential amplifiers 141 to 148 receive the same voltage, thereby inputting predetermined voltages to the A/D converters 151 to 158. When the multiplexers 421 to 428 start to output the reference voltage signals Vref, the imaging control unit 109 samples a predetermined number N of data DA, each of the data is shown below as DAn, output from the A/D converters 151 to 158, and calculates a sum ΣDAn of N target values DAn (step S104). In step S102, since the reference value is set in each D/A converter, correcting a variation from DAn can make the offset due to 1/f noise approach 0. In addition, since output value from each D/A converter at the state in which DAn is acquired is set to ±0, it is possible to effectively use the dynamic range of the D/A converter.

It is known that since sampled data varies in value due to the noise generated in the multiplexers 421 to 428, the differential amplifiers 141 to 148, and the A/D converters 151 to 158, the larger the sampling count, the higher the accuracy of an average value will be in terms of statistics.

When the imaging control unit 109 detects a synchronization signal (step S105), the radiation imaging apparatus 100 performs an imaging operation. That is, the apparatus starts accumulation upon resetting all the pixels in the flat panel sensor 105 (step S106), and performs the sample/hold operation a predetermined time after the start of accumulation (step S107). Upon completing the sampling operation in the above manner, the imaging control unit 109 acquires data for offset correction before reading out signals from the flat panel sensor 105. The operation of acquiring data for offset correction (steps S108 to S110) will be described below.

The imaging control unit 109 asserts SEL (sets it at high level), and selects the reference voltage signal Vref as an input to each of the multiplexers 421 to 428 (step S108). Note that at this time, the above reference value is set in each of the D/A converters 411 to 418. While selecting the reference voltage signal Vref, the imaging control unit 109 samples the predetermined number N of output data DBn from the A/D converters 151 to 158, and obtains a sum ΣDBn of the sampled data (step S109). Selecting the reference voltage signal Vref can measure 1/f noise generated in each of the multiplexers 421 to 428, differential amplifiers 141 to 148, and A/D converters 151 to 158 as a variation from the target value.

In this case, the imaging control unit 109 calculates DCn=(ΣDAn−ΣDBn)/N as correction data, and outputs the result to each of the D/A converters 411 to 418 (step S110). The obtained correction value DCn represents a variation from the target value. Although the output correction value is digital data, each of the D/A converters 411 to 418 converts the data into an analog signal, performs predetermined analog signal processing via each of the amplifiers 401 to 408, and inputs the resultant signal to a corresponding one of addition circuits 431 to 438. Adding the correction value input to each of the addition circuits 431 to 438 to an output signal from a corresponding one of the multiplexers 421 to 428 will correct the offset. If, for example, 1/f noise is generated to increase the offset, the measured value ΣDBn becomes larger than the target value ΣDAn. For this reason, the value DCn becomes negative. As a result, the imaging control unit 109 applies the correction value in a direction to decrease the offset superimposed on the output signal from each of the multiplexers 421 to 428.

Figure 11:
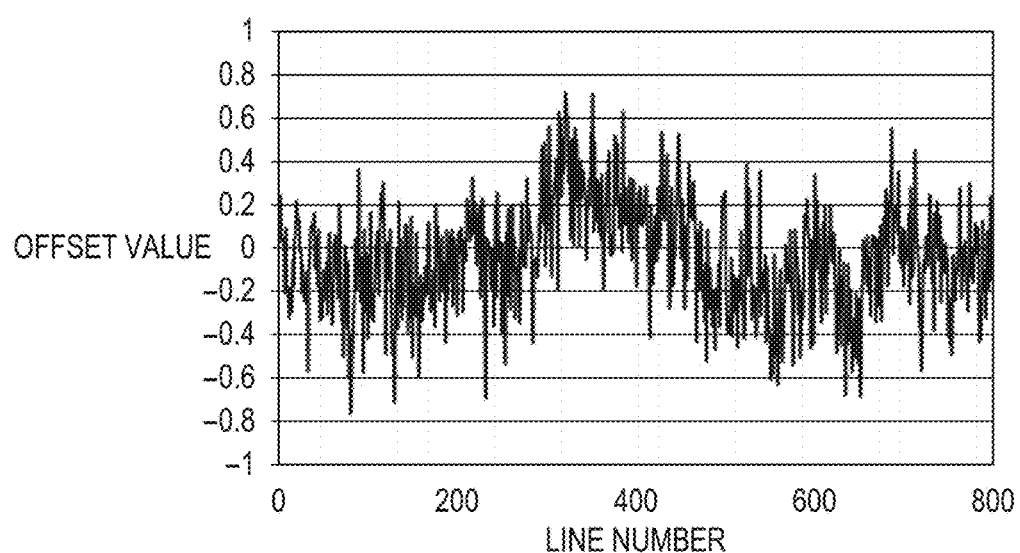
FIG. 11 is a graph showing offsets on the respective lines of an image.
Figure 24A:
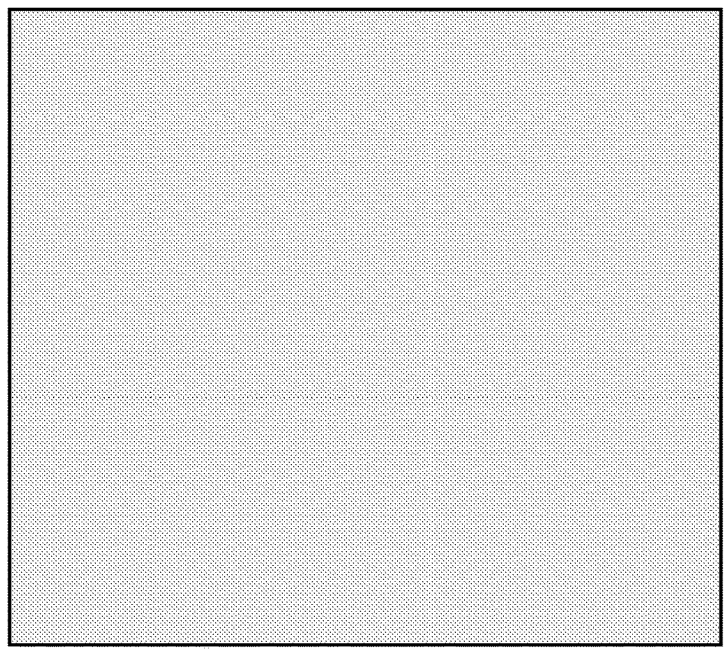
FIG. 24A is a view schematically showing an image without any 1/f noise.
Figure 24B:
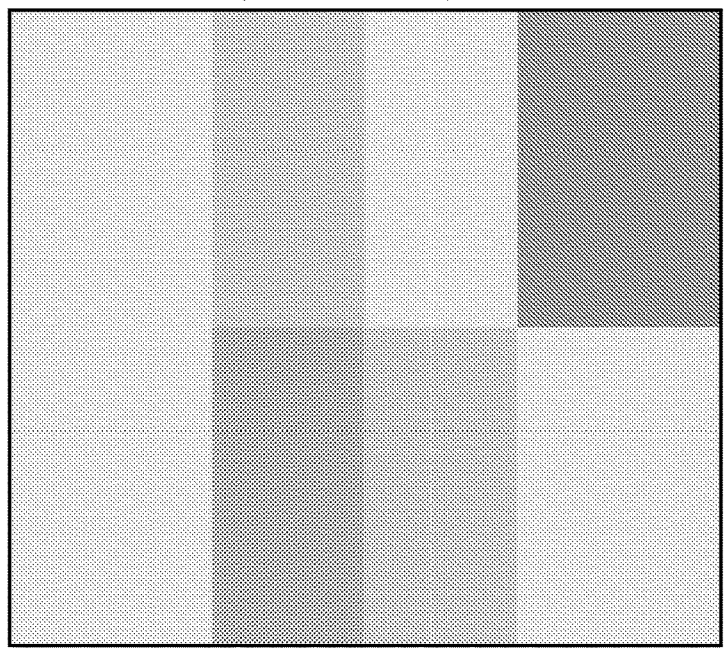
FIG. 24B is a view schematically showing an image with 1/f noise.

In this manner, the apparatus can correct 1/f noise generated in the multiplexers 421 to 428, the differential amplifiers 141 to 148, and the A/D converters 151 to 158. Since the apparatus executes this processing in synchronism with a synchronization signal, it is possible to decide an offset correction value for each frame. However, 1/f noise varies even during a readout period in which the apparatus performs scanning in one frame using the vertical and horizontal shift registers and sequentially outputs the voltages sampled and held in the capacitors CS and CN to the outside. FIG. 11 is a graph showing the relationship between the line numbers of an image and offsets at the time when the apparatus completes the processing in step S110. With the correction method of performing offset correction only once before pixel readout operation upon completion of sampling, a block artifact is left on an A/D converter basis, as shown in FIG. 24B.

In the first embodiment, therefore, the apparatus corrects, in real time, 1/f noise which varies during readout operation by acquiring data for offset correction and adjusting correction values for offsets even during a period in which the apparatus sequentially outputs the voltages sampled and held in the capacitors CS and CN to the outside. The following will describe the operation of acquiring data for offset correction while sequentially outputting the voltages sampled and held in the capacitors CS and CN by scanning operating using the vertical and horizontal shift registers, and adjusting correction values (offset correction values) for offset correction.

Figure 8:
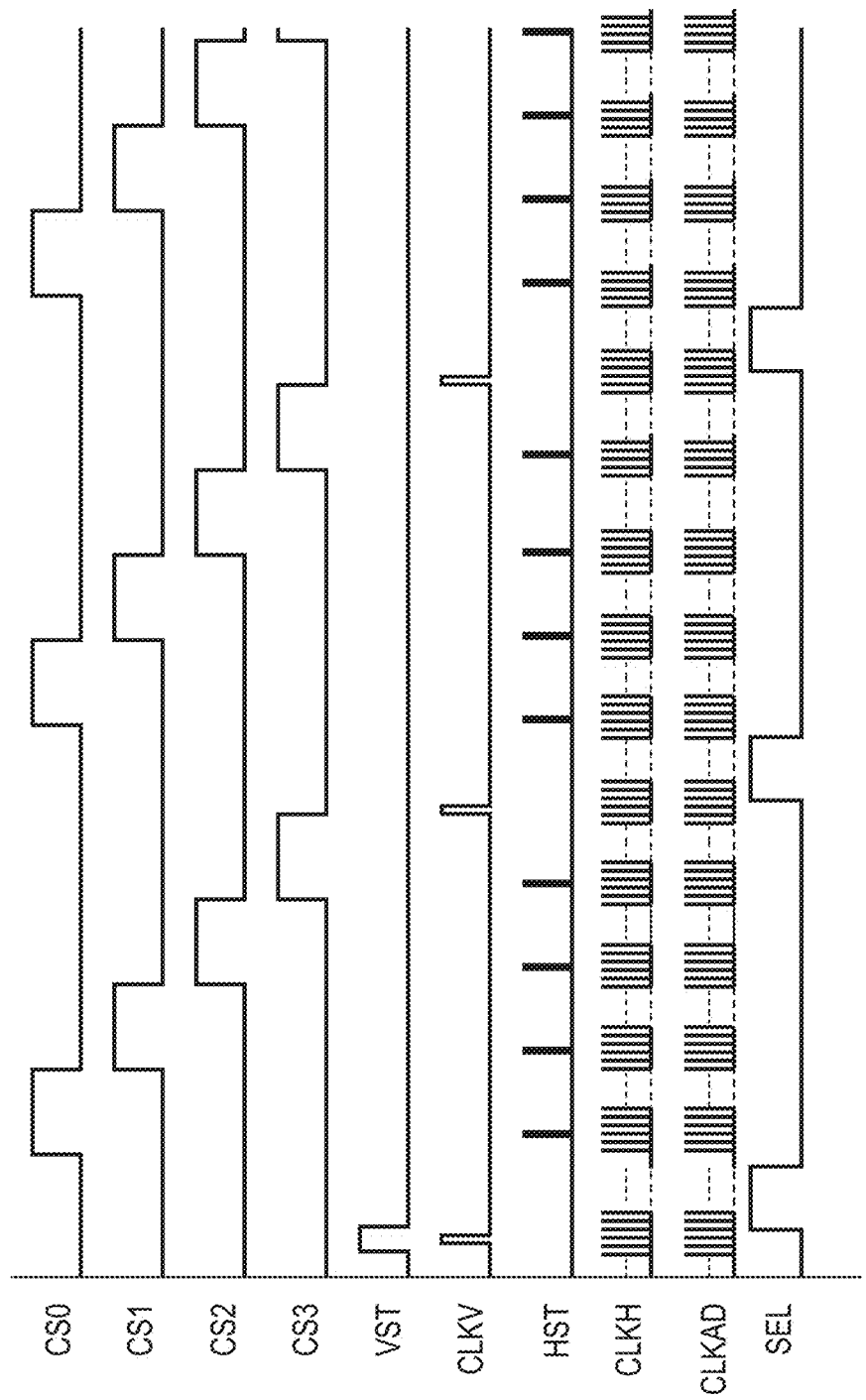
FIG. 8 is a timing chart showing control signals on the rectangular semiconductor substrates according to the first embodiment.
Figure 9:
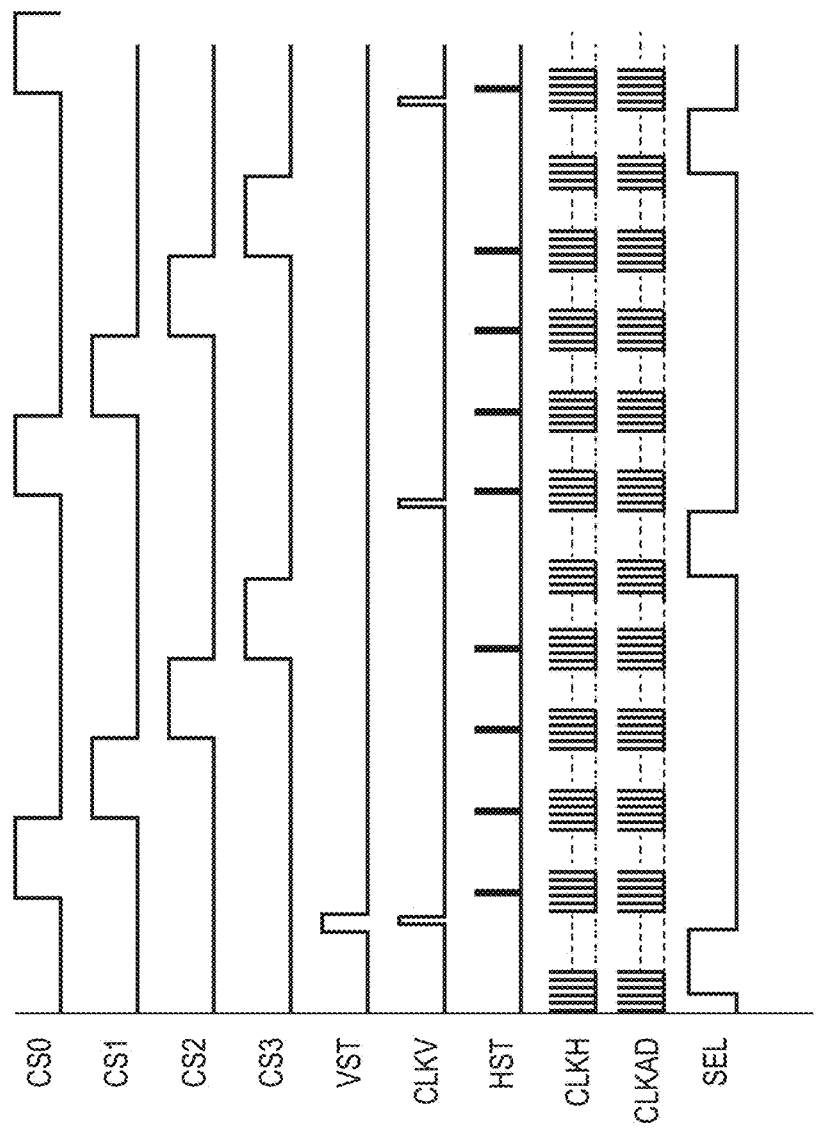
FIG. 9 is a timing chart showing control signals on the rectangular semiconductor substrates according to the first embodiment.

As shown in FIG. 8, the apparatus selects a line m from which the vertical scanning circuit 303 performs readout operation by controlling the vertical scanning start signal terminal VST and the vertical scanning clock terminal CLKV (step S111). At this time, the apparatus executes the processing of acquiring data for offset correction in steps S112 to S114. As shown in FIG. 8, the imaging control unit 109 sets SEL at high level to select the reference voltage signal Vref as an input to each of the multiplexers 421 to 428 (step S112). While selecting the reference voltage signal Vref, the imaging control unit 109 samples a predetermined number N' of output data DPn from the A/D converters 151 to 158 and obtains a sum $\Sigma DPn'$ of the output data (step S113).

In this case, if a sampling count N (first sampling count) acquired at the time of the generation of target value data before imaging operation is equal to a sampling count N' (second sampling count) acquired for offset correction at the time of readout operation (N=N'), it is possible to obtain $DRn=(\Sigma DAn-\Sigma DPn')/N$ as correction data. On the other hand, sampling counts in steps S104, S109, and S113 need not be equal to each other. If, for example, the first sampling count is a predetermined multiple of the second sampling count, that is, sampling count N=M×N', $DRn=(\Sigma DAn-\Sigma DPn'\times M)/N$ may be obtained.

Shortening the time required for switching between the vertical and horizontal shift registers for faster frame rate will shorten the intervals of switching between lines. For this reason, the sampling count N' acquired for offset correction at the time of readout operation at the intervals of switching between lines can sometimes be set to only a value considerably smaller than the count N. When obtaining an average, the smaller the number of data sampled, the higher the influence of random noise will be.

The imaging control unit 109 therefore obtains a correction value DRn by using the weighted average of $\Sigma DBn$ and $\Sigma DPn'\times M$, and outputs the value to each of the D/A converters 411 to 418. If, for example, M is large, the weight of $\Sigma DBn$ may be increased. As M decreases, the weight of $\Sigma DPn'\times M$ may be increased. With this operation, while the sampling count is small, $\Sigma DBn$ is dominant. This can reduce the influence of random noise due to a small sampling count.

In addition, in order to improve the accuracy by increasing the apparent sampling count of $\Sigma DPn'$, a plurality of sums $\Sigma DPn'$ acquired currently and previously may be used. This embodiment is configured to increase the sampling count by using, in addition to $\Sigma DPn'(m)$ acquired on the mth line, $\Sigma DPn'(m-1)$, $\Sigma DPn'(m-2)$, ..., $\Sigma DPn'(m-k)$ acquired on k lines before the mth line. Note however that k is a natural number equal to or more than 0, and k<m. A memory (not shown) in the imaging control unit 109 holds $\Sigma DPn'(m-1)$, $\Sigma DPn'(m-2)$, ..., $\Sigma DPn'(m-k)$. Using $\Sigma DSn'$ as the simple averaging result of $\Sigma DPn'(m)$, $\Sigma DPn'(m-1)$, $\Sigma DPn'(m-2)$, ..., $\Sigma DPn'(m-k)$ will obtain offset correction value $DRn=(\Sigma DAn-\Sigma DSn'\times M)/N$. Using the moving average (simple moving average) based on sampling results on recent k+1 lines can reduce the influence of random noise by increasing the apparent sampling count.

The imaging control unit 109 outputs the correction value DRn obtained by the above calculation to each of the D/A converters 411 to 418 (step S114). With this operation, even if the sampling count that can be acquired on each line is small, it is possible to suppress the influence of random noise and correct, in real time, 1/f noise which varies during readout operation.

Subsequently, the imaging control unit 109 reads out pixel data on the selected line m (step S115). Upon completing the readout operation, the imaging control unit 109 determines whether the line m is the last line (step S116). If the line m is not the last line, the process returns to step S111. The imaging control unit 109 then starts offset correcting operation for the next line.

The imaging control unit 109 repeats the above operation to read out pixels from the rectangular semiconductor substrates 106. When the line m reaches the last line, the process advances from step S116 to step S117. The imaging control unit 109 then determines whether the imaging operation is complete. Upon determining that the imaging operation is complete, the imaging control unit 109 terminates the imaging operation. If the imaging operation is not complete, the process returns to step S105 to continuously perform imaging operation for the next image.

It is possible to obtain a certain effect by correcting noise using either DCn or DRn. As in this embodiment, however, correcting noise by using both DCn and DRn can further reduce artifacts due to 1/f noise. That is, it is possible to eliminate 1/f noise in each frame by adjusting an offset correction value every time extracting an image signal from a photoelectric conversion element group (pixel circuit group) obtained by dividing the plurality of photoelectric conversion elements (the plurality of pixel circuits) in the rectangular semiconductor substrates 106.

Although this embodiment is configured to use one line as the above photoelectric conversion element group and perform correction by obtaining the correction value DRn for each line, the present invention is not limited to this. For example, it is possible to implement more efficient processing by setting a group of a plurality of lines as a correction target. In addition, setting at least one pixel unit as a correction target can follow even high-frequency variations and further improve the efficiency. According to another example, a correction target is changed within one frame. For example, the apparatus adjusts an offset correction value for every two lines with respect to a predetermined number of initial lines and execute offset correcting operation for every line with respect to the remaining lines.

In addition, in this embodiment, although the apparatus selects the reference voltage signal Vref by setting SEL at high level after selecting the line m from which readout operation is performed, as indicated by steps S111 to S114 in FIG. 7 and FIG. 8, the order of the steps to be performed is not limited to this. The apparatus may perform step S110 in FIG. 7 first and then perform steps S112, S113, S111, S114, and S115 in the order named. That is, as shown in FIG.

9, the apparatus selects the reference voltage signal Vref by setting SEL at high level immediately before selecting the readout line m, and performs correction upon obtaining the correction value DRn. It is however preferable to minimize the time difference between pixel data readout operation and sampling of a reference voltage signal for correction.

According to the flowchart of FIG. 7, the apparatus starts acquiring a target value upon setting an imaging mode (step S101). However, the apparatus may acquire a target value before the start to set an imaging mode. Target value data for offset correction before imaging operation varies depending on conditions such as temperature. It is therefore preferable to acquire a value when the data becomes stable.

When obtaining an offset correction value, the imaging control unit 109 outputs, as a correction value, the average value obtained by dividing ($\Sigma$DAn−$\Sigma$DBn), ($\Sigma$DAn−$\Sigma$DPn'×M), or ($\Sigma$DAn−$\Sigma$DSn'×M) by N. However, the values to be used are not limited to them. For example, the amplifiers 401 to 408 each may be provided with a gain of 1/N and calculate an average. With this operation, values equal to or less than the resolutions of the A/D converters 151 to 158 become effective to allow accurate correction.

In addition, in the first embodiment, the analog multiplexers 131 to 138 sequentially select three or four rectangular semiconductor substrates 106. However, the present invention is not limited to this. For example, one each of a differential amplifier, A/D converter, and offset correction circuit may be provided for one rectangular semiconductor substrate 106 (the analog multiplexers 131 to 138 can be omitted). This arrangement can reduce 1/f noise even in a moving image of a high frame rate.

In addition, in this embodiment, $\Sigma$DSn', which can be obtained only when the sampling count N acquired for offset correction at the time of readout operation at the intervals of switching between lines can be set to a value considerably smaller than N, is set as the calculation result of a simple moving average of k+1 values based on $\Sigma$DPn'(m), $\Sigma$DPn'(m−1), $\Sigma$DPn'(m−2), . . . , $\Sigma$DPn'(m−k). The present invention is not limited to this, but can use a weighted average result (weighted moving average). Since an offset varies at 1/f, a correction value may shift with a simple average due to the influence of a past value. It is possible to more accurately calculate the influence of current offset variations by calculating a weighted moving average with larger weights being assigned to data sampled on lines closer to the sampled value $\Sigma$DPn' on a target line. It is also possible to use an offset correction value obtained by recursive processing like that described in the second embodiment in place of the moving averaging method.

When obtaining an average corresponding to k+1 lines, it is necessary to provide an area (memory) for saving sampled data. In addition, it is necessary to update saved data every time the correction target line changes. Although a large sampling count is required to obtain an average, as the number of lines used to obtain an average or a sampling count increases, a larger memory is required.

Second Embodiment

In the first embodiment, if the response time of one of the D/A converters 411 to 418, amplifiers 401 to 408, addition circuits 431 to 438, and multiplexers 421 to 428 is slow, the correction value obtained in step S114 shifts relative to the correction target line. This may lead to failure to correct an offset in real time. The second embodiment is therefore configured to perform offset correction by predicting a correction value in order to correct, in real time, 1/f noise which varies during readout operation even in the above case. The second embodiment will exemplify a method of recursively obtaining offset correction values.

The arrangement of a radiation moving image capturing apparatus, the arrangement of an image sensor driving apparatus, and the basic driving operation in the second embodiment are the same as those in the first embodiment (FIGS. 1 to 9). The second embodiment is configured to predict a correction value suitable for correction a predetermined number of lines after the current line by using $\Sigma$DAn, $\Sigma$DBn, and $\Sigma$DPn ($\Sigma$DPn'×M) obtained in steps S104, S109, and S113 in FIG. 7 (step S114).

A sampled value $\Sigma$DQn'(m) on the mth line is recursively obtained in the following manner. Let $\alpha$ be a feedback coefficient. However, $0<\alpha<1$, and an optimal value is used for each system.

$$\Sigma DQn'(m)=(1-\alpha)\Sigma DPn'+\alpha\Sigma DQn'(m-1) \tag{1}$$

When $\Sigma$DQn'(m) is recursively obtained with the feedback coefficient $\alpha$, if m→∞, noise attenuation rate $R=\sigma_{out}/\sigma_{in}$ of $\Sigma$DQn'(m) becomes asymptotic as indicated by equation (2). Assume that in this case, there is no noise correlation between lines.

$$R = \frac{\sigma_{out}}{\sigma_{in}} = \sqrt{\frac{(1-\alpha)^2}{(1-\alpha^2)}} \tag{2}$$

In this case, it is possible to make the noise attenuation rate R on the second and subsequent lines always approach an asymptotic value by setting the attenuation rate R to the value of equation (2) from the time when m=1 by using $\Sigma$DBn and sampled data $\Sigma$DPn'(1) on the first line.

It is therefore possible to make the noise attenuation rate R always approach an asymptotic value from the first line by obtaining a recursive sampled value $\Sigma$DQn'(1) at the time when m=1 according to equation (3) and obtaining the recursive sampled value $\Sigma$DQn'(m) at the time when m>1 according to equation (1). Assume however that sampling count N=M×N'.

$$\Sigma DQn'(1)=(1-\beta)\Sigma DPn'+\beta\Sigma DBn/M \tag{3}$$

Let $\beta$ be a feedback coefficient when m=1. Since $\Sigma$DBn differs in sampling count from $\Sigma$DPn' by M times, it can be said that noise $\sigma$ in $\Sigma$DBn is $1/\sqrt{M}$ that in $\Sigma$DPn'. Based on this, $\beta$ is obtained by $$\beta = \frac{1-\sqrt{1-\left(1+\frac{1}{M}\right)(1-R^2)}}{\left(1+\frac{1}{M}\right)} \tag{4}$$

If $(1-R^2)/R^2>M$, there is no solution for $\beta$. If, therefore, the feedback coefficient $\alpha$ is to be set to a large value, since the sampling count N of DBn is large, no value can be obtained unless noise is sufficiently small.

The apparatus calculates correction value DRn=($\Sigma$DAn−$\Sigma$DQn'×M)/N by using $\Sigma$DQn' obtained in the above manner, and outputs the result to each of D/A converters 411 to 418 (step S114). The processing in step S115 and subsequent steps is the same as that in the first embodiment.

With the above processing, it is possible to predict an offset correction value for a correction target line. Even if, therefore, a response time is slow, the apparatus can correct 1/f noise generated in multiplexers 421 to 428, the differential amplifiers 141 to 148, and A/D converters 151 to 158 in real time. In addition, even if the switching time between the vertical and horizontal shift registers is short because of a high frame rate, and a sampling count N' is small, it is possible to suppress the influence of random noise by using the recursive processing described in the second embodiment.

The second embodiment has exemplified the recursive processing. However, if, for example, the response delay of either of the D/A converters 411 to 418, amplifiers 401 to 408, addition circuits 431 to 438, and multiplexers 421 to 428 is relatively small, it is possible to use a moving averaging method like that described in the first embodiment as a method of predicting a correction value. When using the moving averaging method, the result obtained by the moving averaging method is set as a correction value for a correction target line. However, the moving averaging method requires a memory for saving a plurality of values $\Sigma DPn(m)$ used for calculation. In contrast to this, using the recursive processing can reduce the memory to be used as compared with the case of using the moving averaging method because only the values $\Sigma DPn'(m)$ and $\Sigma DQn'(m-1)$ are required to obtain the correction value $\Sigma DQn'(m)$. In addition, the recursive processing can reach an asymptotic value faster than the moving averaging method. Therefore, the recursive processing can correct temporarily varying 1/f noise more effectively than the moving averaging method.

Third Embodiment

Figure 10:
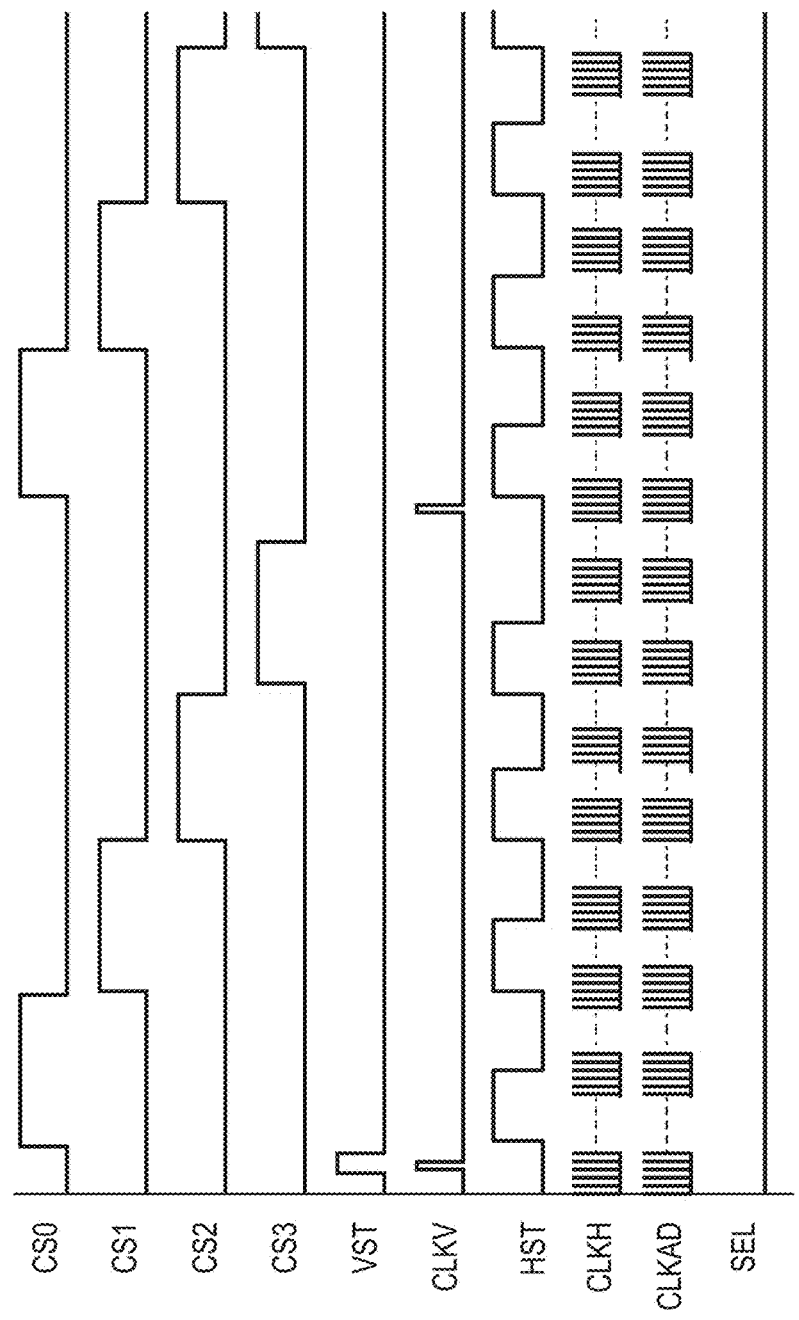
FIG. 10 is a timing chart showing control signals on rectangular semiconductor substrates according to the third embodiment.

In the first and second embodiments, at the time of measuring a target value and an offset, the multiplexers 421 to 428 select reference voltage signals. However, the present invention is not limited to this. For example, when measuring a target value and an offset, after multiplexers 421 to 428 select analog multiplexers 131 to 138, and CLKV is made to rise as shown in FIG. 10, CS0 to CS3 and HST may be prolonged by a sampling time to sample a predetermined number of pixel data of the first pixel of each line of each rectangular semiconductor substrate 106, thereby correcting the offset. Since the offsets generated in the respective rectangular semiconductor substrates 106 differ from each other, it is necessary to acquire the pixel data of the first pixel of each rectangular semiconductor substrate 106. In this case, a memory (not shown) stores the data of each line of each rectangular semiconductor substrate 106, sampled as a target value, on a line basis, and is read out from the memory (not shown) for each line of the rectangular semiconductor substrate 106, thereby calculating a correction value. This makes it possible to perform measurement including offset variations due to 1/f noise generated in the rectangular semiconductor substrates 106. In addition, it is possible to reduce artifacts. Furthermore, since the third embodiment does not use any reference voltage in the operation of obtaining an offset correction value, it is possible to omit the multiplexers 421 to 428 which select signals based on output signals from the analog multiplexers 131 to 138 and the reference voltage signal Vref.

Fourth Embodiment

As described above, when low-frequency 1/f noise is generated in each of a rectangular semiconductor substrate, differential amplifier, and A/D converter, a blockish artifact appears on an A/D converter basis, as shown in FIG. 24B. Each embodiment described above is configured to reduce the above artifacts by adjusting an offset correction value provided for each of the addition circuits 431 to 438 every time extracting an image signal from a photoelectric conversion element group within a frame. On the other hand, the setting timing of a target value for offset correction also contributes to the generation and reduction of artifacts. If, for example, a target value for offset correction is set every time an imaging mode is switched, the target value set at the time of the acquisition of an offset correction image (dark image) may change at the time of actual imaging operation. If images obtained by actual imaging operation are corrected by offset correction images acquired with different target values, steady offsets may be generated. According to the fourth embodiment, a target value set at the time of acquisition of an offset correction image can be reliably used for actual imaging operation.

Figure 12:
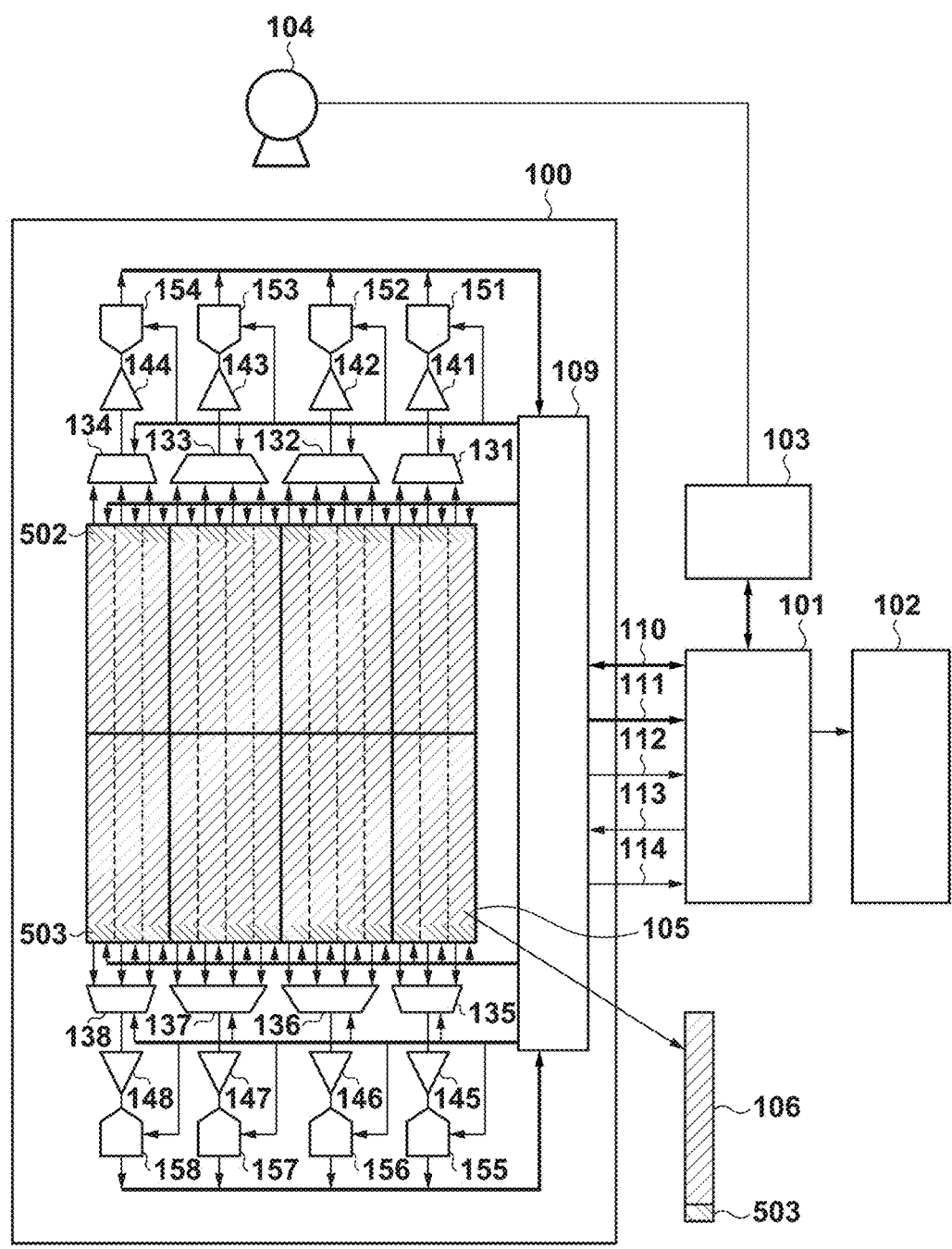
FIG. 12 is a block diagram showing a radiation moving image capturing apparatus system according to the fourth embodiment.

FIG. 12 is a block diagram showing an example of the arrangement of an imaging system including an imaging apparatus according to the fourth embodiment. The same reference numerals as in the first embodiment (FIG. 1) denote the same components in the fourth embodiment. Light-shielding portions 502 and 503 shield regions corresponding to photoelectric conversion element groups, the light-shielding portion being a portion of a plurality of photoelectric conversion elements (pixel circuits) two-dimensionally arrayed on a flat panel sensor 105. In this embodiment, the light-shielding portions 502 and 503 optically shield CMOS image sensors corresponding to a predetermined number of lines on the upper and lower side portions of the flat panel sensor 105. These light-shielded regions are regions corresponding to a predetermined number of adjacent lines, of a plurality of photoelectric conversion elements, which are arranged side by side in the horizontal direction. The light-shielded regions are regions including the first line for scanning in the vertical direction. When correcting offset variations due to 1/f noise (to be described later), the apparatus reads out pixel data from the light-shielded regions and performs offset correction. Note that the arrangements of pixel circuits and rectangular semiconductor substrates 106 according to the fourth embodiment, their operation timings, and the like are the same as those in the first embodiment (FIG. 2 to FIGS. 5A and 5B).

Figure 13:
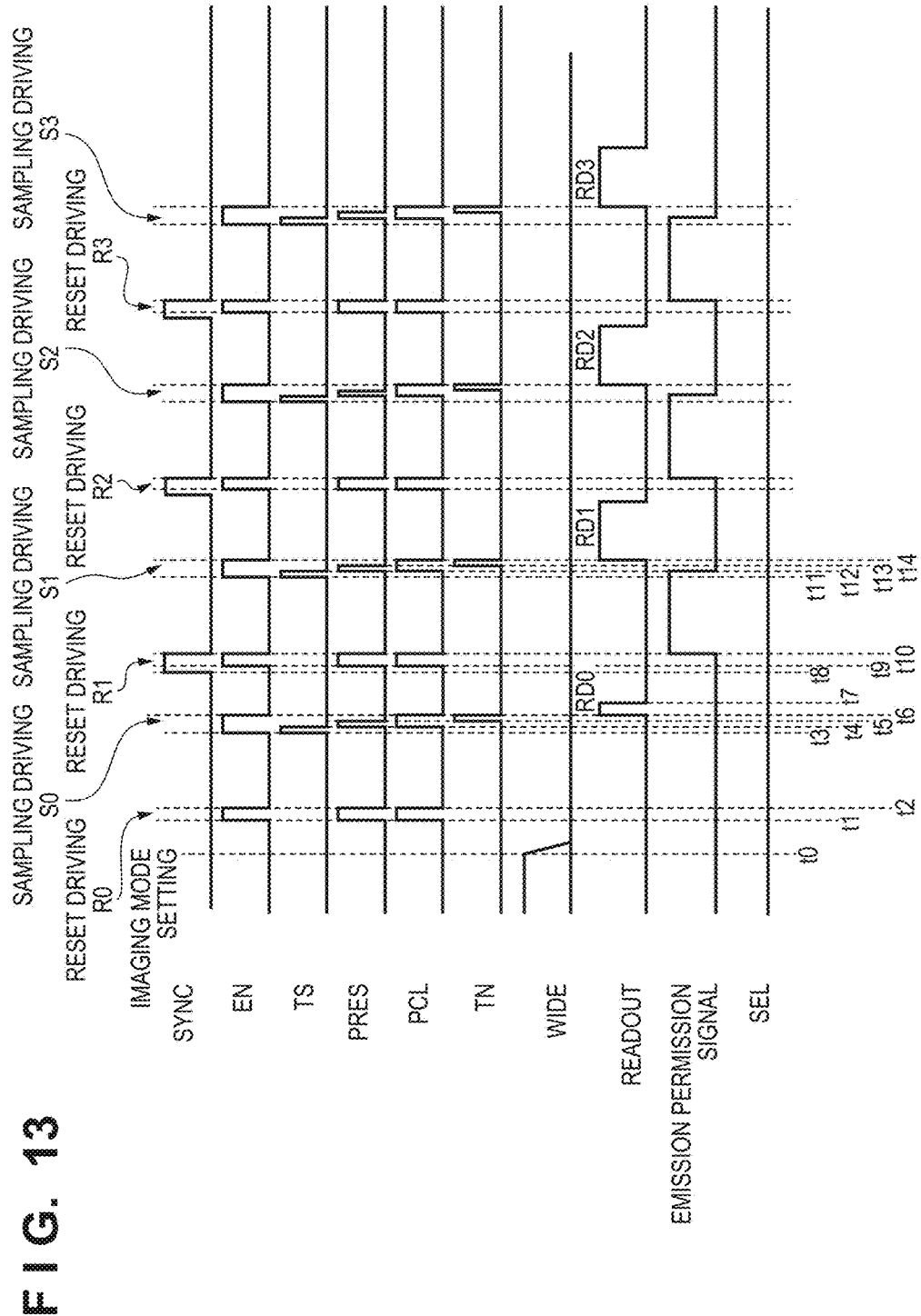
FIG. 13 is a timing chart showing the imaging operation of the fourth embodiment.
Figure 14:
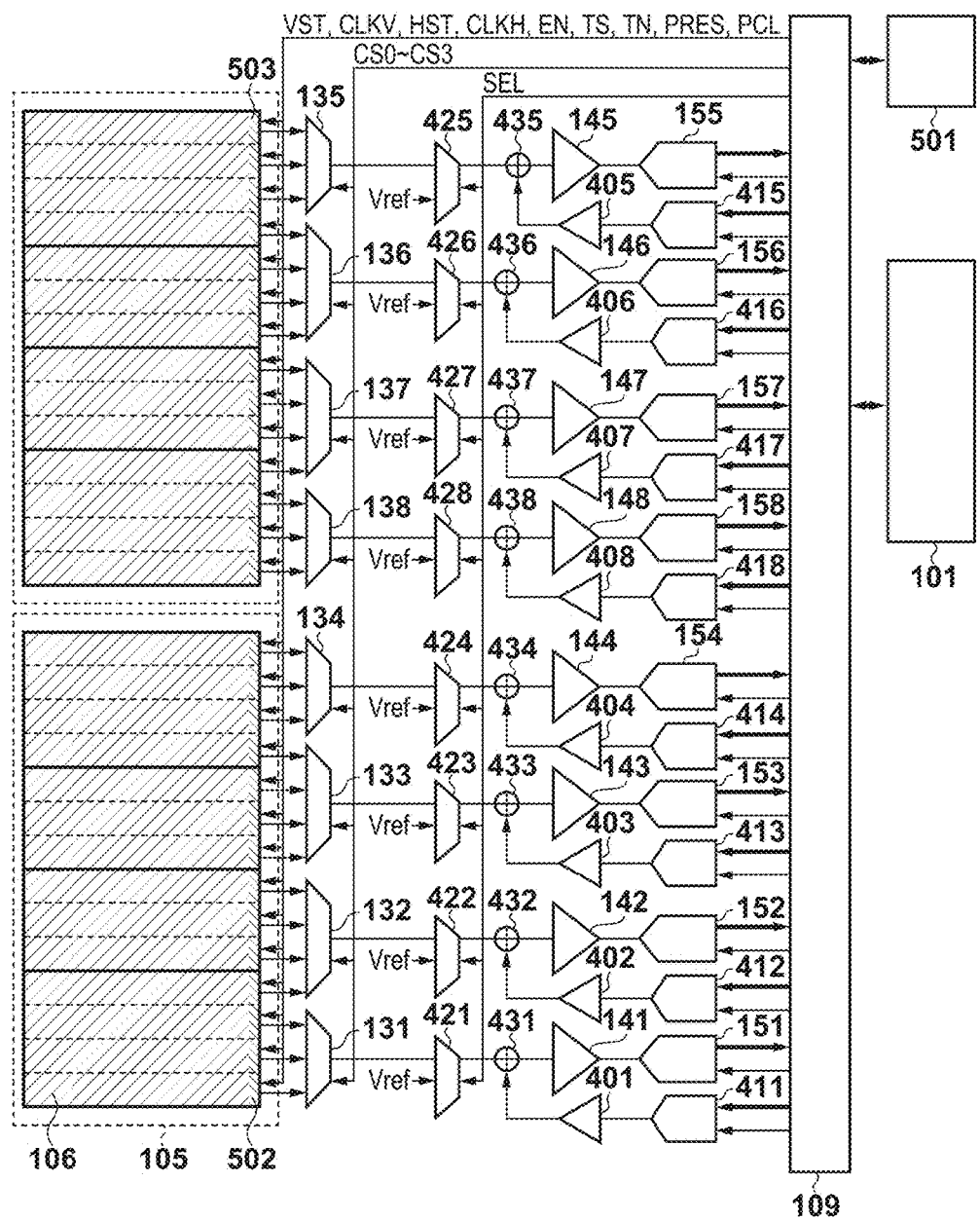
FIG. 14 is a block diagram showing a radiation imaging apparatus according to the fourth embodiment.
Figure 15:
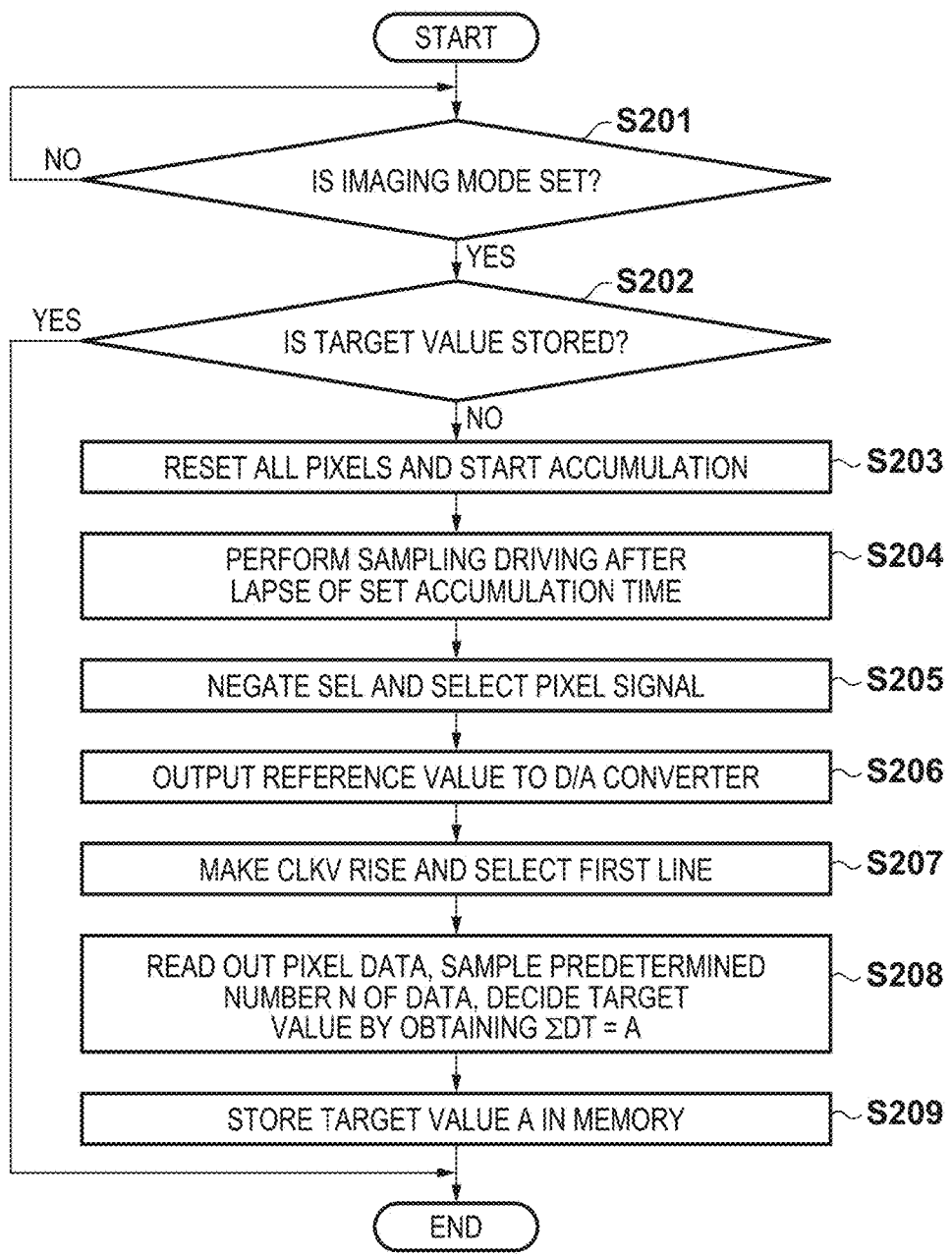
FIG. 15 is a flowchart showing a procedure for acquiring a target value for offset correction according to the fourth embodiment.
Figure 16:
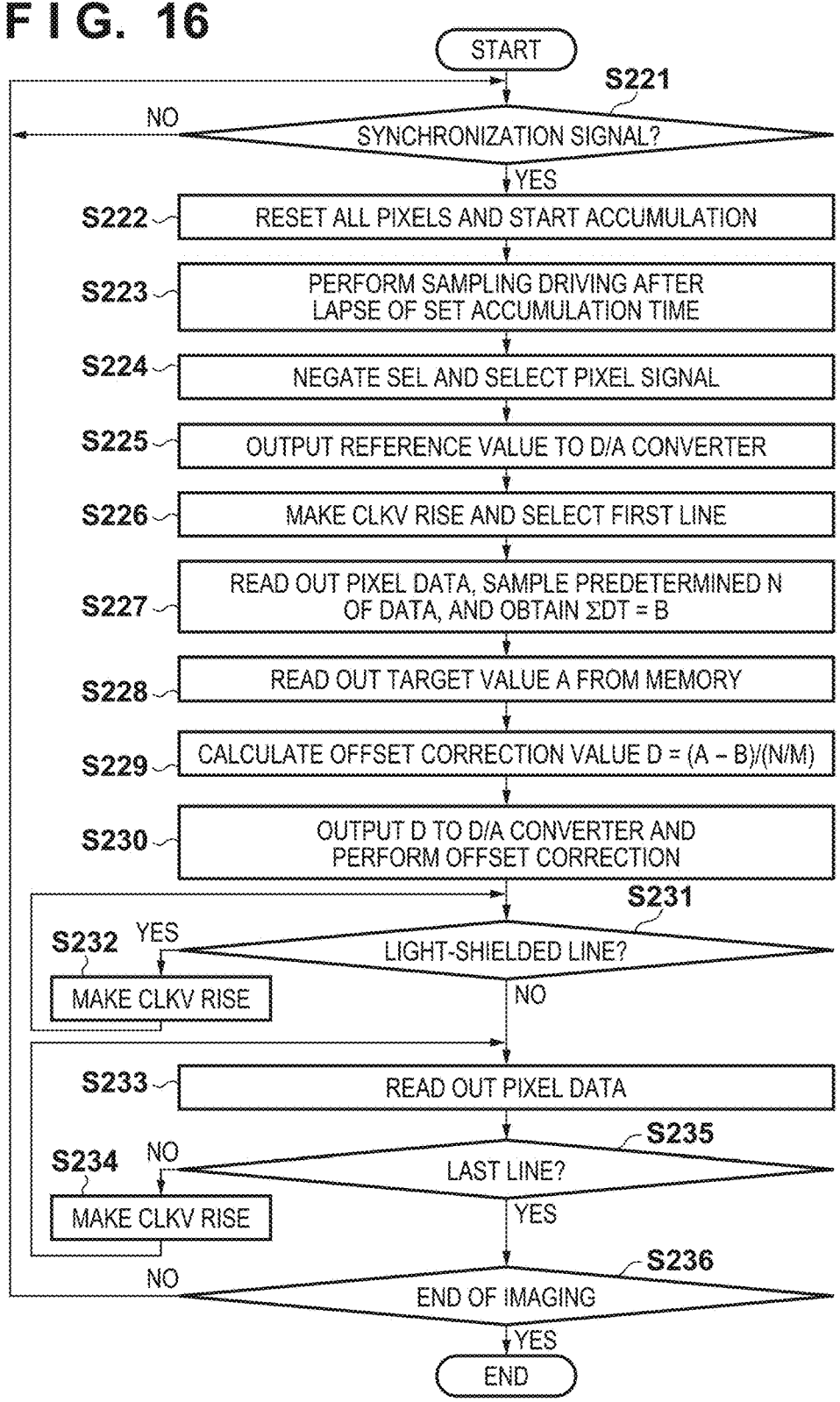
FIG. 16 is a flowchart showing processing at the time of imaging operation according to the fourth embodiment.

The following will describe, with reference to FIGS. 13, 14, 15, and 16, a method of correcting offset variations due to 1/f noise generated in various types of semiconductor devices, which is executed in the fourth embodiment, in sampling operation when capturing a moving image by intermittently irradiating an object with radiation in the form of pulses. FIG. 13 is a timing chart showing imaging operation according to the fourth embodiment. FIG. 14 is a block diagram showing an example of the arrangement of an image sensor driving apparatus according to the fourth embodiment. FIGS. 15 and 16 are flowcharts for explaining the operation of the image sensor driving apparatus according to the fourth embodiment.

Referring to FIGS. 14 and 15, first of all, an imaging control unit 109 stands by until a system control apparatus 101 sets an imaging mode (step S201). This imaging mode includes, for example, at least one of a frame rate indicating imaging intervals, an accumulation time for the accumulation of radiation, the sensitivity of each pixel circuit, size information of an output image, and image acquisition for offset correction. When an imaging mode is set at time t0 in FIG. 13, the imaging control unit 109 makes settings for the rectangular semiconductor substrates 106 in accordance with the imaging mode.

The imaging control unit 109 then checks whether a memory 501 stores a target value for offset correction which corresponds to the set imaging mode (step S202). If the memory 501 does not store any target value corresponding to the set imaging mode, the process advances to step S203, in which the imaging control unit 109 starts the operation of generating a target value at the time of offset correction before imaging operation. Upon detecting in step S202 that the memory 501 has already stored a target value for offset correction which corresponds to the set imaging mode, the imaging control unit 109 terminates the target value generating operation.

Target value generating operation will be described with reference to FIG. 14. FIG. 14 corresponds a radiation imaging apparatus 100 in FIG. 12. The same reference numerals as in FIG. 6 denote the same components in FIG. 14. The arrangement of the fourth embodiment additionally includes the memory 501 for storing a target value for offset correction for each imaging mode. For the sake of easy recognition, FIG. 14 shows the rectangular semiconductor substrates 106 arrayed in the vertical direction. In practice, however, they are arranged in the manner shown in FIG. 12.

In order to generate a target value for offset correction, first of all, the imaging control unit 109 performs reset driving R0 for reading out data from the pixel regions of the rectangular semiconductor substrates 106 which represent optical shielded by the light-shielding portions 502 and 503. The imaging control unit 109 performs this reset driving by using signals EN, PRESS, and PCL in the interval between time t1 and time t2. The timing of each signal is the same as that in reset driving R1 shown in FIG. 3.

The imaging control unit 109 performs reset driving for all the pixels of the tiled imaging elements on the tiled rectangular semiconductor substrates 106 collectively at the same timing in the same period. The imaging control unit 109 performs this operation in this manner to prevent image misregistration caused by temporal switching offsets between imaging elements and between scanning lines at the time of moving image capturing. Thereafter, the imaging control unit 109 performs accumulation by one-shot exposure to accumulate, in a capacitor Cfd, charge generated by a photodiode PD in each pixel circuit. Reset noise (kTC noise) is generated in the photoelectric conversion unit during the application of a reference voltage VRES to the photodiode PD in reset driving 0 from time t1 to time t2. The imaging control unit 109 removes this reset noise by setting a reference voltage VCL on the second pixel amplifier M7 side of a clamping capacitor Ccl of a clamping circuit.

The imaging control unit 109 starts sampling driving in the interval between time t3 and time t6 after the lapse of the accumulation time set at the time of setting the imaging mode (step S204). Sampling driving is the same as that performed in the interval between time t60 and time t70 in FIG. 3 described above.

Readout processing operation RD0 (between time t6 and time t7) for a pixel group optically shielded by the light-shielding portions 502 and 503 will be described next. First of all, the imaging control unit 109 sets a signal SEL (FIG. 14) at low level (FIG. 13) and controls multiplexers 421 to 428 to output pixel signals (step S205). The imaging control unit 109 then outputs a reference value to each of D/A converters 411 to 418 so as to make its output become a center value (step S206). As shown in FIG. 5A, the imaging control unit 109 sets VST at high level to make CLKV rise, thereby selecting the first line (step S207).

When CLKV rises, the internal circuit of a vertical scanning circuit 303 in FIG. 4 is reset to output high level to an output V1 of the vertical scanning circuit 303. One line controlled by a row signal line 305 is selected to activate a pixel output. Subsequently, when CLKH rises while HST is set at high level, the internal circuit of a horizontal scanning circuit 304 is reset to output high level to an output H1 of the horizontal scanning circuit 304. With this operation, a pixel circuit 302 selected by H1 of the pixels on one line activated by the row signal line 305 outputs an output to the analog output terminal. Subsequently, when pulses CLKH are sequentially input, the high-level output of the horizontal scanning circuit 304 sequentially shifts to H1, H2, . . . , Hn, thereby completing 1-line readout operation.

The imaging control unit 109 switches the outputs of the rectangular semiconductor substrates 106 connected to analog multiplexers 131 to 138 by sequentially setting CS0 to CS3 at high level, as shown in FIG. 5A, thereby starting pixel data readout operation. The imaging control unit 109 samples a predetermined number N of data output from A/D converters 151 to 158, and obtains sum $\Sigma DT=A$ of N sampled data DT, thereby deciding a target value (step S208).

Sampled data vary in value due to shot noise, thermal noise, and the like generated in the multiplexers 421 to 428, the differential amplifiers 141 to 148, and the A/D converters 151 to 158. It is therefore known that the larger the sampling count, the higher the accuracy of an average value will be in terms of statistics. That is, since the N sampled data are normally distributed as indicated by histogram A in FIG. 17, the larger the sampling count, the closer to the true value the average value will be. Letting M be an integer, the attenuation rate of each of the amplifiers 401 to 408 may be set to 1/M, and a sampling count N may be set to a multiple of M, thereby obtaining a target value. This makes it possible to sufficiently decrease the output resolution of each of the amplifiers 401 to 408 relative to the resolution of each of the A/D converters 151 to 158. As a consequence, it is possible to accurately correct offset variations due to 1/f noise.

Upon deciding target value A in the above manner, the imaging control unit 109 stores target value A at a predetermined address in the memory 501 which corresponds to the imaging mode (step S209). That is, the memory 501 holds target value A in correspondence with the set imaging mode. This allows the use of the same target value A for offset correction image (dark image) acquired in the imaging mode and an image acquired by actual imaging operation. Thereafter, the radiation imaging apparatus 100 waits for the start of imaging, i.e., the input of a synchronization signal.

Referring to FIG. 16, the imaging control unit 109 detects a synchronization signal for the first image input from the system control apparatus 101. Upon receiving a synchronization signal SYNC from the system control apparatus 101 at time t8 in FIG. 13, the imaging control unit 109 detects it (step S221). Upon detecting the synchronization signal SYNC, the imaging control unit 109 performs reset driving to start the accumulation of radiation (step S222). Reset driving R1 which starts at time t9 in FIG. 13 corresponds to this operation. Reset driving R1 is the same as reset driving (t51 to t56) described with reference to FIG. 3.

Upon performing reset driving R1, the imaging control unit 109 terminates the resetting operation and clamping operation of the pixel, starts accumulation in the photodiode PD, and activates the emission of radiation. Since an accumulation state is set, the imaging control unit 109 enables an emission permission signal to request for the emission of X-rays at time t10.

The imaging control unit 109 then starts sampling driving after the lapse of the set accumulation time (step S223). This sampling driving corresponds to sampling driving S1 in the interval between time t11 and time t14 in FIG. 13, and is the same as sampling driving (t60 to t70) shown in FIG. 3. In this sampling driving, the imaging control unit 109 sets a signal TS at low level at time t12, and disables the emission permission signal to inhibit X-ray emission. Note that the imaging control unit 109 collectively performs sampling driving S1 for all the pixels. The imaging control unit 109 controls the subsequent sampling driving according to this timing. Subsequently, the imaging control unit 109 performs readout processing operation RD1 for the pixel group optically shielded by the light-shielding portions 502 and 503, and starts offset correcting operation for reducing offset variations due to 1/f noise and the like.

The imaging control unit 109 sets SEL at low level and selects a pixel signal as an input for each of the multiplexers 421 to 428 at time t14 (step S224). The imaging control unit 109 then outputs a reference value to the D/A converter so as to make its output become a center value (step S225). As shown in FIG. 5A, the imaging control unit 109 sets VST at high level to make CLKV rise (step S226), thereby selecting the first line.

When CLKV rises, the internal circuit of the vertical scanning circuit 303 (FIG. 4) is reset to output high level to the output V1 of the vertical scanning circuit 303. One line controlled by the row signal line 305 is selected to activate a pixel output. When CLKH rises while HST is set at high level, the internal circuit of the horizontal scanning circuit 304 is reset to output high level to the output H1 of the horizontal scanning circuit 304. With this operation, the pixel circuit 302 selected by H1 of the pixels on one line activated by the row signal line 305 outputs an output to the analog output terminal. When the pulses CLKH are sequentially input, the high-level output of the horizontal scanning circuit 304 sequentially shifts to H1, H2, ..., Hn, thereby completing 1-line readout operation.

The imaging control unit 109 switches the outputs of the rectangular semiconductor substrates 106 connected to the analog multiplexers 131 to 138 in FIG. 14 by sequentially setting CS0 to CS3 at high level, as shown in FIG. 5A, thereby reading out pixel data (step S227). The imaging control unit 109 samples a predetermined number N of pixel data output from the A/D converters 151 to 158, and obtains sum $\Sigma DT=B$ of N sampled data DT. The predetermined count N is equal to the sampling count when target value A is obtained.

Figure 18:
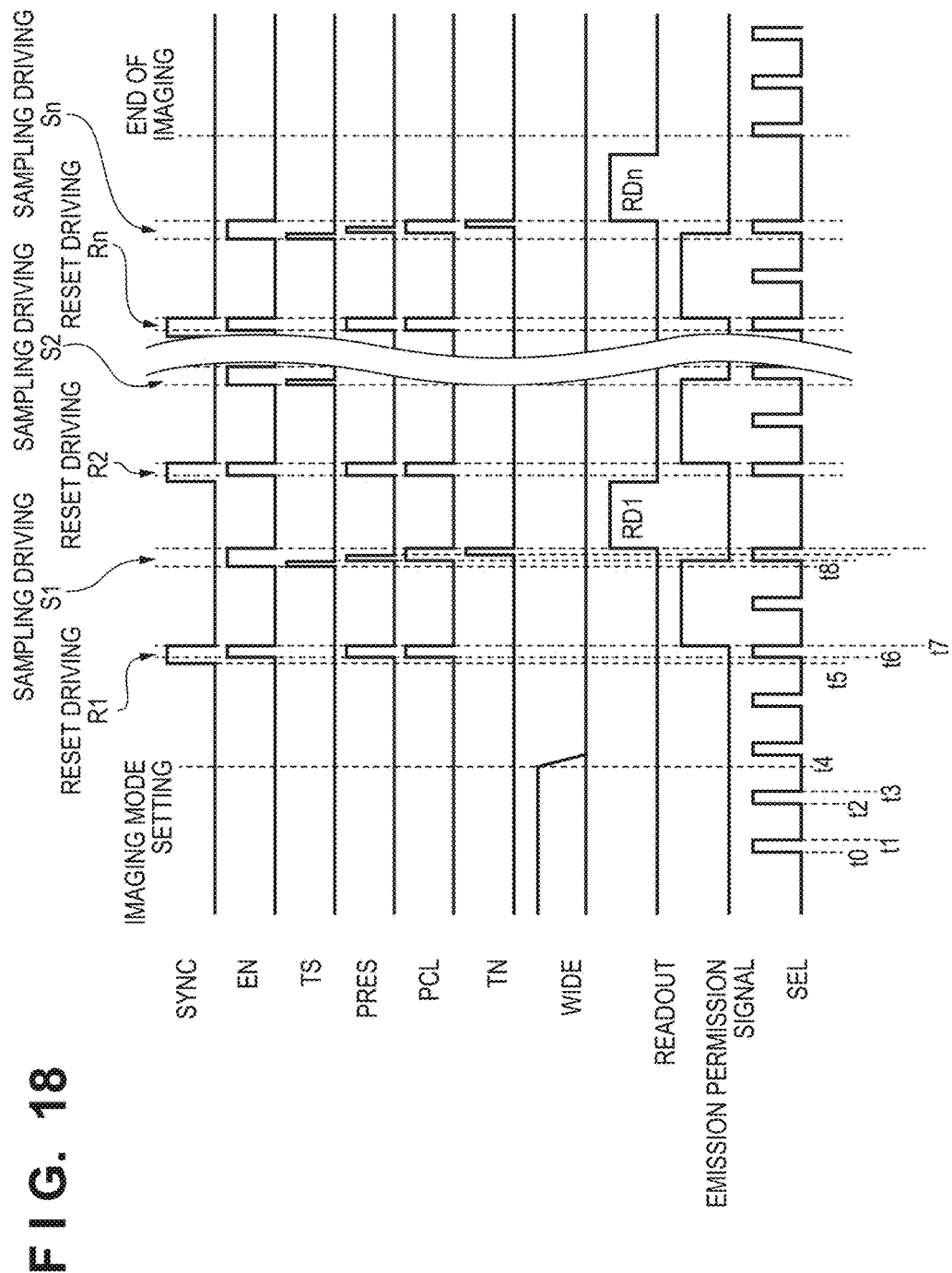
FIG. 18 is a timing chart showing the imaging operation of an imaging apparatus according to the fifth embodiment.

In this case, the N sampled data are normally distributed as indicated by histogram B in FIG. 18. Therefore, a difference C between the average value of the distribution indicated by histogram B and the average value of the distribution indicated by histogram A becomes an offset amount to be corrected.

First of all, the imaging control unit 109 reads out target value A corresponding to the set imaging mode from the memory 501 (step S228). The imaging control unit 109 then calculates $D=(A-B)/(N/M)$ as correction data which is a digital value when the attenuation rate of each of amplifiers 401 to 408 to 1/M (step S229). The correction value obtained by this calculation is a value M times a variation from the target value. The imaging control unit 109 outputs the obtained correction value to each of the D/A converters 411 to 418 (step S230). Although the output correction value is digital data, each of the D/A converters 411 to 418 converts it into an analog signal. Analog signal processing is performed for this analog signal to make an output signal from each of the amplifiers 401 to 408 become 1/M. The addition circuits 431 to 438 then add the signals to output signals from the multiplexers 421 to 428 to correct offsets.

If, for example, the resolution of each of the A/D converters 151 to 158 is 14 bits and the input range is 2 V, a voltage value corresponding to one bit is 122 µV. If the resolution of each of the D/A converters 411 to 418 is 12 bits and the output range is 2 V, a voltage value corresponding to one bit is 488 µV. If, therefore, the attenuation rate of each of the amplifiers 401 to 408 is 1/20, the output resolution of each of the amplifiers 401 to 408 is 24.4 µV. It is therefore possible to perform offset correction with a resolution five times higher than the resolution of each of the A/D converters 151 to 158. In addition, since it is possible to use D/A converts each having a resolution lower than that of each other A/D converters 151 to 158 as the D/A converters 411 to 418, it is possible to decrease the cost. Furthermore, the solution of each of the D/A converters 411 to 418 is not limited to 12 bits. Using 14- or 16-bit D/A converters can further improve the offset correction accuracy. Note that the arrangement in which the attenuation rate of each of the amplifiers 401 to 408 is set to 1/M can be applied to each embodiment described above.

Figure 17:
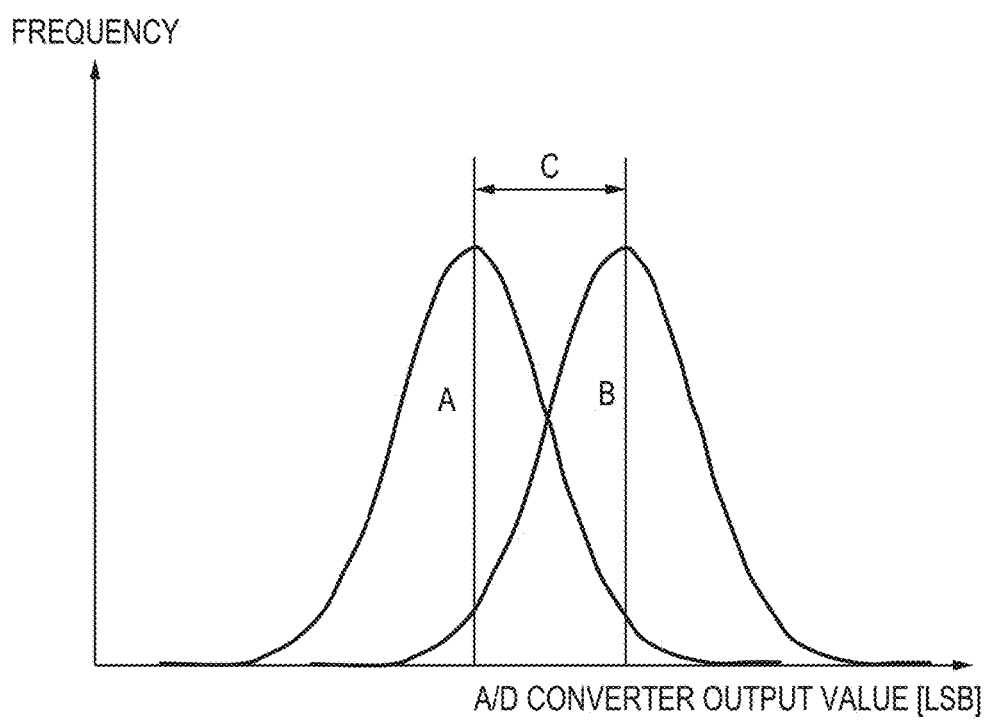
FIG. 17 is a histogram showing the distribution of data sampled at the time of offset correcting operation.

With this arrangement, if 1/f noise is generated and the offset increases as indicated by histogram B in FIG. 17, measured value B becomes larger than target value A. For this reason, the offset correction value calculated in step S229 becomes negative, and outputs from the D/A converters 411 to 418 are applied in a direction to decrease offsets superimposed on output signals from the multiplexers 421 to 428 (step S230).

Upon completing the offset correcting operation, the imaging control unit 109 determines whether the current line is located in the light-shielding portion (step S231). If the current line is a line corresponding to the light-shielding portion, the process advances to step S232 to make CLKV rise again and make the vertical scanning circuit 303 select V2. The imaging control unit 109 repeats steps S231 and S232. Upon detecting in step S231 that the $m^{th}$ line which is a line irrelevant to the light-shielding portion is selected, the process advances to step S233.

The imaging control unit 109 switches the outputs of the rectangular semiconductor substrates 106 connected to the analog multiplexers 131 to 138 by sequentially setting CS0 to CS3 at high level, as shown in FIG. 17. The imaging control unit 109 performs the operation of reading out pixel data from the pixel region irradiated with light in this manner (step S233). The imaging control unit 109 then determines whether the current line is the last line in S235. If the current line is the last line, the process advances to step S236. If the current line is not the last line, the process advances to step S234, in which the imaging control unit 109 makes CLKV rise to perform the operation of reading out pixel data from the next line. The apparatus reads out pixels from the rectangular semiconductor substrates 106 by sequentially repeating these operations.

In step S236, the imaging control unit 109 checks whether the imaging operation is complete. If the imaging operation is not complete, the process returns to step S221 to detect a synchronization signal for the next image. Upon determining that the imaging operation is complete, the imaging control unit 109 terminates the operation. The timing chart of FIG. 13 exemplifies the case in which such pixel readout processing has been performed three times as indicated by RD1, RD2, and RD3.

As described above, according to the fourth embodiment, the apparatus reads out pixel data from the pixel region on the light-shield portion before the start of pixel data readout operation, and performs offset correction base on the pixel data. This makes it possible to correct offset variations due to 1/f noise generated in the rectangular semiconductor substrates 106, the multiplexers 421 to 428, the differential amplifiers 141 to 148, and the A/D converters 151 to 158. That is, the apparatus can perform pixel readout processing while offsets are corrected. In particular, the fourth embodiment is configured to store target value A in the memory 501 for each imaging mode and perform offset correction upon reading out a target value from the memory 501 in accordance with a set imaging mode. This makes it possible to use a target value corresponding to variations caused by an imaging mode such as offsets caused by an accumulation time for the accumulation of radiation and the sensitivity of each pixel circuit. This makes it possible to accurately correct the offset variation due to the 1/f noise. It is therefore possible to generate, starting from the first image, images in which artifacts due to 1/f noise are reduced.

Note that in the fourth embodiment described above, the apparatus reads out pixel data only on the first lines of the regions light-shielded by the light-shielding portions 502 and 503 in steps S207 and S208 in FIG. 15 or in steps S226 and S227 in FIG. 16 to acquire target value A and measured value B, and generates offset correction values. However, the present invention is not limited to this. The apparatus may read out pixel data on a plurality of light-shielded lines to set a target value for offset correction or generate an offset correction value.

In addition, the fourth embodiment is configured to acquire a target value for offset correction in accordance with the setting of an imaging mode by the system control apparatus 101. However, the present invention is not limited to this. For example, the apparatus may acquire a target value only when a set imaging mode is designed to acquire an image for offset correction for each imaging mode. This makes it possible to set the same target value for an image for offset correction and an image for actual imaging operation, and hence generate, starting from the first image, images in which artifacts due to 1/f noise are reduced.

It is obvious for those who are skilled in the art that the arrangement configured to store the setting timing of a target value of the fourth embodiment and the target value in a memory in correspondence with an imaging mode and use the stored data can be applied to each embodiment described above. Note that since the fourth embodiment uses no reference voltage in the operation of obtaining an offset correction value, the multiplexers 421 to 428 may be omitted.

Fifth Embodiment

Each embodiment described above is configured to detect a difference from a target value in response to the start of imaging operation and obtain an offset correction value. However, performing offset correction using the same target value at the time of, for example, switching an imaging mode after the setting of the target value may increase the difference between the offset at the time of the acquisition of the target value and the currently occurring offset, resulting in increases in block noise in first few frames. The fifth embodiment is configured to execute the processing of generating offset correction values at predetermined intervals after the setting of a target value in order to solve such a problem.

Figure 19:
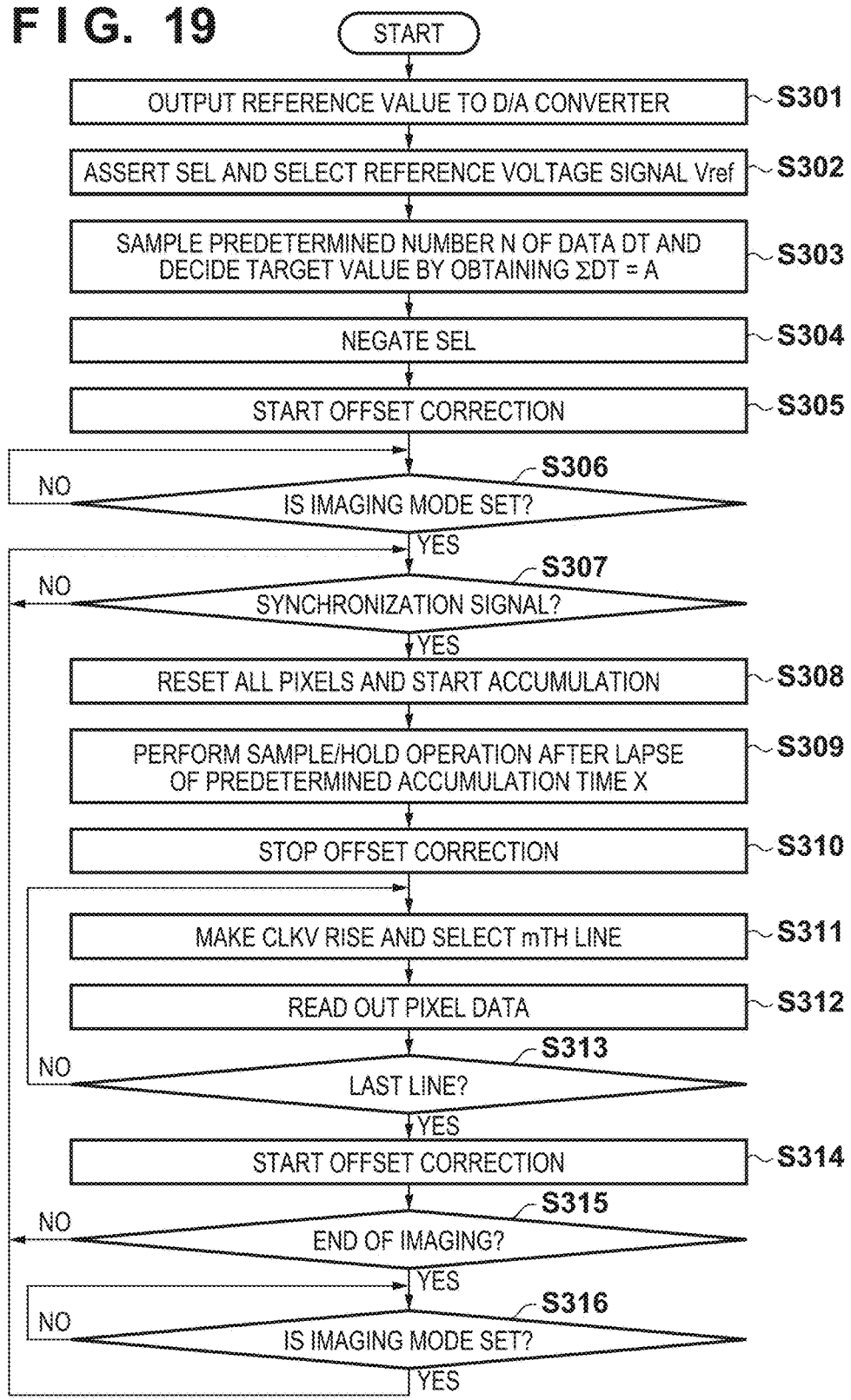
FIG. 19 is a flowchart showing rectangular semiconductor substrate control according to the fifth embodiment.

The following will describe, with reference to FIGS. 18, 19, and 20, a method of correcting offset variations due to 1/f noise generated in various types of semiconductor devices, which is performed in the fifth embodiment, in sampling operation when capturing a moving image by intermittently irradiating an object with radiation in the form of pulses. Note that the arrangement and basic operation of a radiation imaging apparatus according to the fifth embodiment are the same as those in the first embodiment (FIGS. 1 to 6). FIG. 18 is a timing chart showing the imaging operation of an image sensor driving apparatus according to the fifth embodiment. FIGS. 19 and 20 are flowcharts showing control on rectangular semiconductor substrates 106 according to the fifth embodiment.

First of all, in the interval between time t0 and time t1 in FIG. 18, an imaging control unit 109 starts the operation of generating a target value for offset correction before imaging operation. To generate a target value for offset correction, first of all, the imaging control unit 109 outputs a reference value to each of D/A converters 411 to 418 so as to make its output become a center value (step S301). The imaging control unit 109 performs control to assert SEL (sets it at high level) to cause each of multiplexers 421 to 428 to output a reference voltage signal Vref (step S302).

The imaging control unit 109 samples a predetermined number N of data output from A/D converters 151 to 158, and obtains sum $\Sigma DT=A$ of N sampled data DT, thereby deciding a target value (step S303). Assume that the attenuation rate of each of amplifiers 401 to 408 is set to 1/M, and the number N of data sampled is set to a multiple of M as in the fourth embodiment.

Sampled data vary in value due to shot noise, thermal noise, and the like generated in the multiplexers 421 to 428, differential amplifiers 141 to 148, and the A/D converters 151 to 158. It is therefore known that the larger the sampling count, the higher the accuracy of the average value of sampled data will be in terms of statistics. That is, since the N sampled data are normally distributed as indicated by histogram A in FIG. 17, the larger the sampling count, the closer to the true value the average value will be. The attenuation rate of each of the amplifiers 401 to 408 is set to 1/M to sample data such that the number N of data sampled becomes a multiple of an integer M, thereby obtaining a target value by dividing the sum by N. This makes it possible to sufficiently decrease the output resolution of each of the amplifiers 401 to 408 relative to the resolution of each of the A/D converters 151 to 158. As a consequence, it is possible to accurately correct offsets due to 1/f noise.

Upon deciding target value A, the imaging control unit 109 negates SEL at time t1 (step S304). Subsequently, the imaging control unit 109 starts offset correction based on target value A (step S305). Offset correcting operation in the fifth embodiment will be described with reference to the flowchart of FIG. 20. When starting offset correcting operation, first of all, the imaging control unit 109 stands by for a predetermined period of time to perform offset correcting operation at predetermined intervals (step S321). It is preferable to experimentally set this standby time in accordance with 1/f noise generated in various types of semiconductor devices in use.

After standing by for a predetermined period of time, the imaging control unit 109 sets SEL at high level at time t2 to select the reference voltage signal Vref as an input to each of the multiplexers 421 to 428 (step S322). While selecting the reference voltage signal Vref, the imaging control unit 109 samples the predetermined number N of the output data DT from the A/D converters 151 to 158 and obtains sum $\Sigma DT=Bn$ (step S323). The predetermined number N is equal to the sampling count at the time of obtaining target value A. At this time, the N sampled data are normally distributed as indicated by, for example, histogram B in FIG. 17. Therefore, a difference C between the average value of the distribution indicated by histogram B and the average value of the distribution indicated by histogram A becomes an offset amount to be corrected.

The imaging control unit 109 therefore calculates D=(A−Bn)/(N/M) as correction data when setting the attenuation rate of each of amplifiers 401 to 408 to 1/M (step S324). The obtained correction value represents a variation from the target value. The imaging control unit 109 outputs the obtained correction value to each of the D/A converters 411 to 418 (step S325). Although the output correction value is digital data, each of the D/A converters 411 to 418 converts it into an analog signal. Analog signal processing is performed for this analog signal to make an output signal from each of the amplifiers 401 to 408 become 1/M. Addition circuits 431 to 438 then add the signals to output signals from the multiplexers 421 to 428. In this manner, the apparatus corrects the offset by using the correction value (digital data) output from the imaging control unit 109.

As described in the fourth embodiment, using the amplifiers 401 to 408 each having an attenuation rate of 1/M can perform offset correction with a resolution exceeding the resolution of each of the A/D converters 151 to 158 by using low-resolution D/A converters.

With the above arrangement, as 1/f noise is generated and an offset increases as indicated by histogram B in FIG. 17, measured value B becomes larger than target value A. For this reason, the offset correction value calculated in step S324 becomes negative, and outputs from the D/A converters 411 to 418 are finally applied in a direction to decrease offsets superimposed on output signals from the multiplexers 421 to 428 (step S325).

Upon completing the offset correcting operation, the imaging control unit 109 negates SEL at time t3 in FIG. 18 (step S326), and determines whether to stop the offset correcting operation (step S327). In this case, when starting to read out pixel data, the imaging control unit 109 terminates the processing from step S327 to stop the offset correcting operation. In other cases, the process returns to step S321 to stand by for a predetermined period of time. That is, while not starting pixel data readout operation, the imaging control unit 109 repeatedly asserts SEL at predetermined time intervals as in the case from time t2 in FIG. 18, and performs offset correcting operation during the assert period of SEL. Note that the apparatus may monitor the stop of offset correction even during a predetermined standby period in step S321 and terminate the processing upon issuance of an instruction to stop offset correction.

Subsequently, the imaging control unit 109 waits until a system control apparatus 101 sets an imaging mode (step S306). This imaging mode includes, for example, a frame rate indicating imaging intervals, an accumulation time for the accumulation of radiation, the sensitivity of each pixel circuit, and size information of an output image. The imaging control unit 109 then makes various types of settings for rectangular semiconductor substrates 106 in accordance with the set imaging mode.

In this case, the system control apparatus 101 has set an imaging mode at time t4 in FIG. 18, and the imaging control unit 109 performs setting operation in the above manner. Subsequently, the imaging control unit 109 detects a synchronization signal for the first image input from the system control apparatus 101 (step S307). In this case, the imaging control unit 109 has received a first synchronization signal SYNC from the system control apparatus 101 at time t5 in FIG. 18.

Upon detecting the synchronization signal SYNC at time t5, the imaging control unit 109 performs reset driving R1 at time t6 to start accumulating electric charge corresponding to radiation (step S308). This reset driving is the same as that described in the first embodiment. The reset driving causes a photodiode PD to start accumulating electric charge, and activates the emission of radiation. The photodiode PD is set in an accumulation state, and hence the apparatus enables an emission permission signal to request the emission of X-rays (time t7). The apparatus controls the subsequent reset driving according to this timing.

The tiled rectangular semiconductor substrates 106 are configured to collectively perform reset driving for all the pixels of the respective tiled imaging elements at the same timing in the same period so as to prevent image misregistration caused by temporal switching offsets between imaging elements and between scanning lines at the time of moving image capturing. Thereafter, the apparatus performs accumulation by one-shot exposure to collectively accumulate, in the capacitor Cfd, charge generated by the photodiode PD in each pixel circuit. Note that reset noise (kTC noise) is generated in the photoelectric conversion unit during the application of the reference voltage VRES to the photodiode PD in reset driving operation from time t6 to time t7. The apparatus removes this reset noise by setting a reference voltage VCL on the second pixel amplifier M7 side of the clamping capacitor Ccl of the clamping circuit.

At t8 in FIG. 18, the imaging control unit 109 starts sampling driving S1 (step S309 in FIG. 19). This sampling driving is the same as that described in the first embodiment. The imaging control unit 109 collectively performs sampling driving S1 for all the pixels. The imaging control unit 109 performs the subsequent sampling driving according to this timing.

Upon completing sampling driving S1, the imaging control unit 109 performs termination processing for offset correcting operation (step S310). With this processing, the offset correcting operation (FIG. 20), which has been performed at predetermined time intervals, stops (YES in step S327).

As described above, the fifth embodiment is configured to repeat offset correction at predetermined intervals while not starting pixel data readout operation. This makes it possible to always correct offset variations due to 1/f noise generated in the multiplexers 421 to 428, the differential amplifiers 141 to 148, and the A/D converters 151 to 158. Since the apparatus can perform pixel readout processing RD1 while offset correction is performed, the apparatus can generate, starting from the first image, images in which artifacts due to 1/f noise are reduced.

Since the imaging control unit 109 sets SEL at low level, the multiplexers 421 to 428 each select a pixel signal. The imaging control unit 109 then sets VST at high level in FIGS. 5A and 5B and makes CLKV rise to select the first row (m=1) (step S311).

When CLKV rises, the internal circuit of a vertical scanning circuit 303 in FIG. 4 is reset to output high level to an output V1 of the vertical scanning circuit 303. One line controlled by a row signal line 305 is selected to activate a pixel output. Subsequently, when CLKH rises while HST is set at high level, the internal circuit of a horizontal scanning circuit 304 is reset to output high level to an output H1 of the horizontal scanning circuit 304. With this operation, a pixel circuit 302 selected by H1 of the pixels on one line activated by the row signal line 305 outputs an output to the analog output terminal. Subsequently, when pulses CLKH are sequentially input, the high-level output of the horizontal scanning circuit 304 sequentially shifts to H1, H2, ..., Hn, thereby completing 1-line readout operation.

The imaging control unit 109 switches the outputs of the rectangular semiconductor substrates 106 connected to analog multiplexers 131 to 138 by sequentially setting CS0 to CS3 at high level, as shown in FIGS. 5A and 5B, thereby performing pixel data readout operation (step S312). Furthermore, the imaging control unit 109 determines whether the current line is the last line (step S313). If the current line is the last line, the imaging control unit 109 resumes offset correcting operation (step S314). If the current line is not the last line, the process returns to step S311. In this case, since the current line is the first line, the process returns to step S311 to perform pixel data readout operation for the next line.

The apparatus reads out pixels from the rectangular semiconductor substrates 106 by sequentially repeating these operations. Upon starting offset correction in step S314, the imaging control unit 109 checks whether the imaging operation is complete (step S315). If the imaging operation is not complete, the process returns to step S307 to continuously perform imaging operation for the next image. If the imaging control unit 109 determines that the imaging operation is complete, the process advances to step S316, in which the imaging control unit 109 stands by until the next imaging mode is set. Note that even during this standby period, the imaging control unit 109 repeatedly performs offset correcting operation started in step S314. This can always keep offset variations due to 1/f noise generated in the multiplexers 421 to 428, the differential amplifiers 141 to 148, and the A/D converters 151 to 158 in a corrected state. For this reason, even if the apparatus starts imaging operation upon setting the next imaging mode in step S316, the apparatus can correct the first image from the start of imaging operation in the next imaging mode and can generate images in which artifacts are reduced.

Although the fifth embodiment is configured to stop offset correcting operation during pixel readout operation on the rectangular semiconductor substrates 106 (steps S311 to S313), the present invention is not limited to this. For example, upon completing pixel readout operation on a predetermined number of lines, the apparatus may select the next line by making CLKV rise, and generate an offset correction value like that shown in FIG. 20 during a line blanking time until HST is set at high level. Alternatively, the apparatus may execute the processing of acquiring data for offset correction, which is shown in steps S112 to S114 as described in the first embodiment, during the interval from step S311 to step S313. In this case, the apparatus also performs offset correction on a line basis, and hence can generate images in which artifacts are further reduced.

Sixth Embodiment

Figure 21:
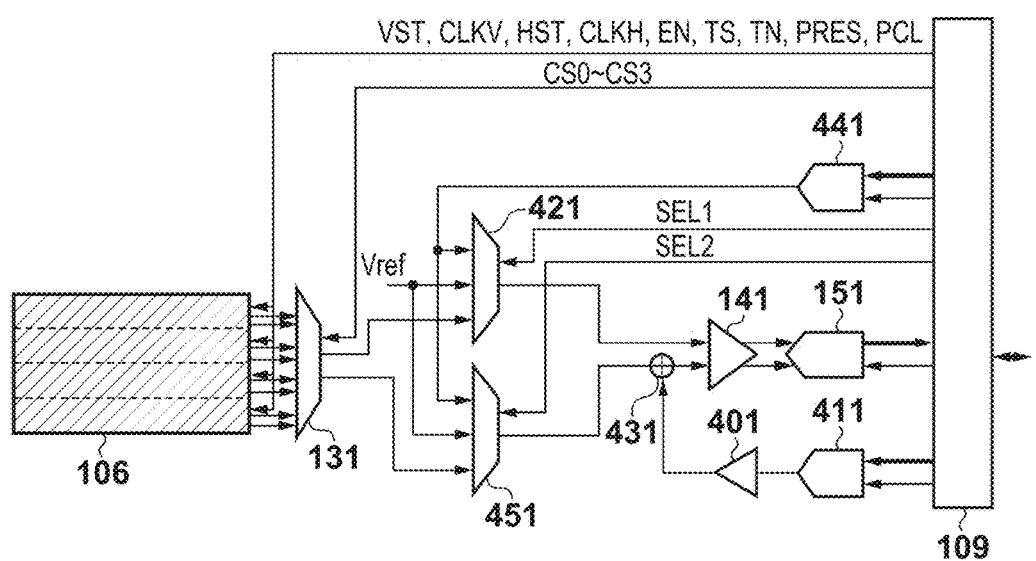
FIG. 21 is a block diagram showing a sensor signal processing circuit according to the sixth embodiment.
Figure 22:
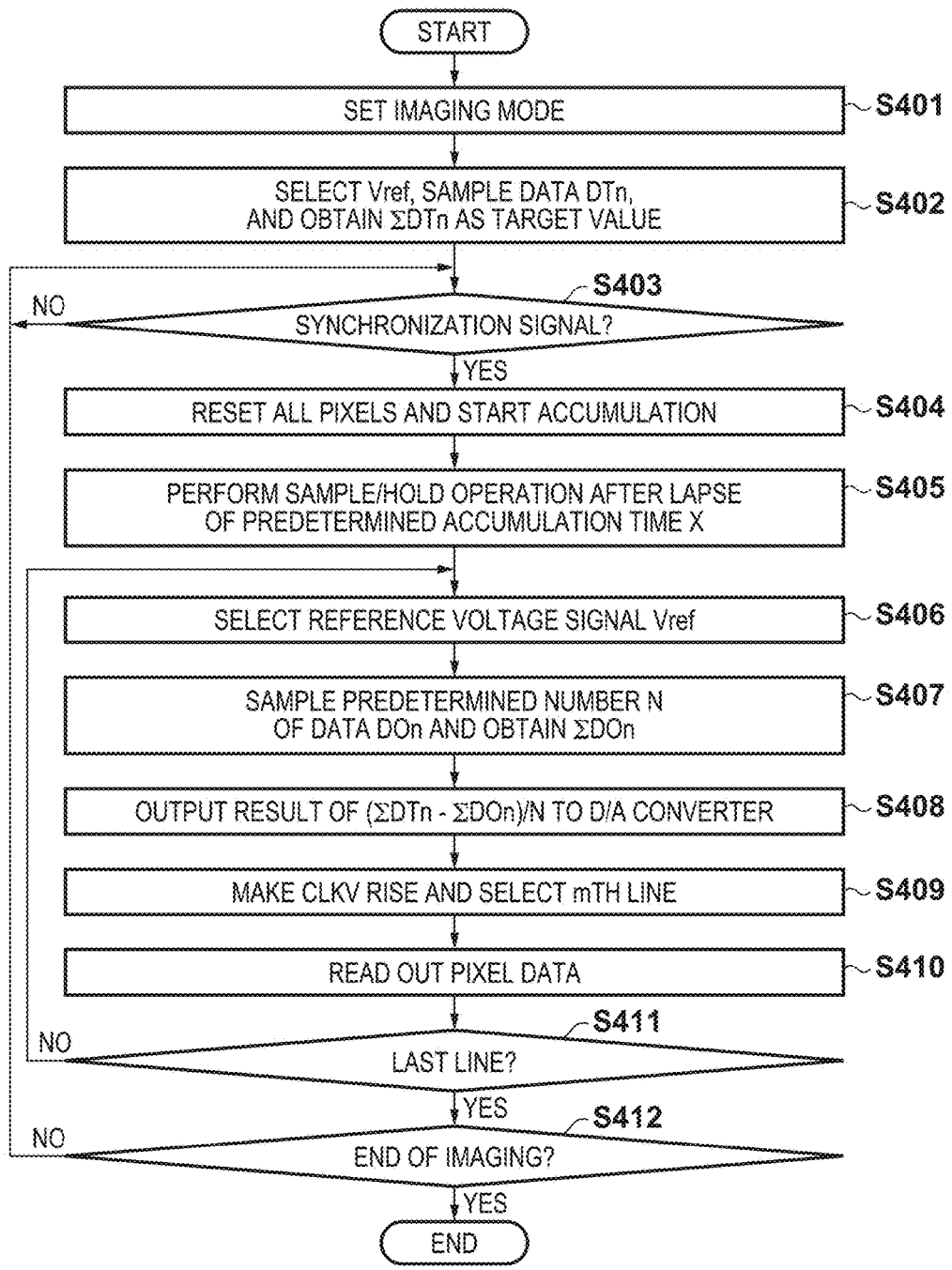
FIG. 22 is a flowchart at the time of rectangular semiconductor substrate control according to the sixth embodiment.
Figure 23:
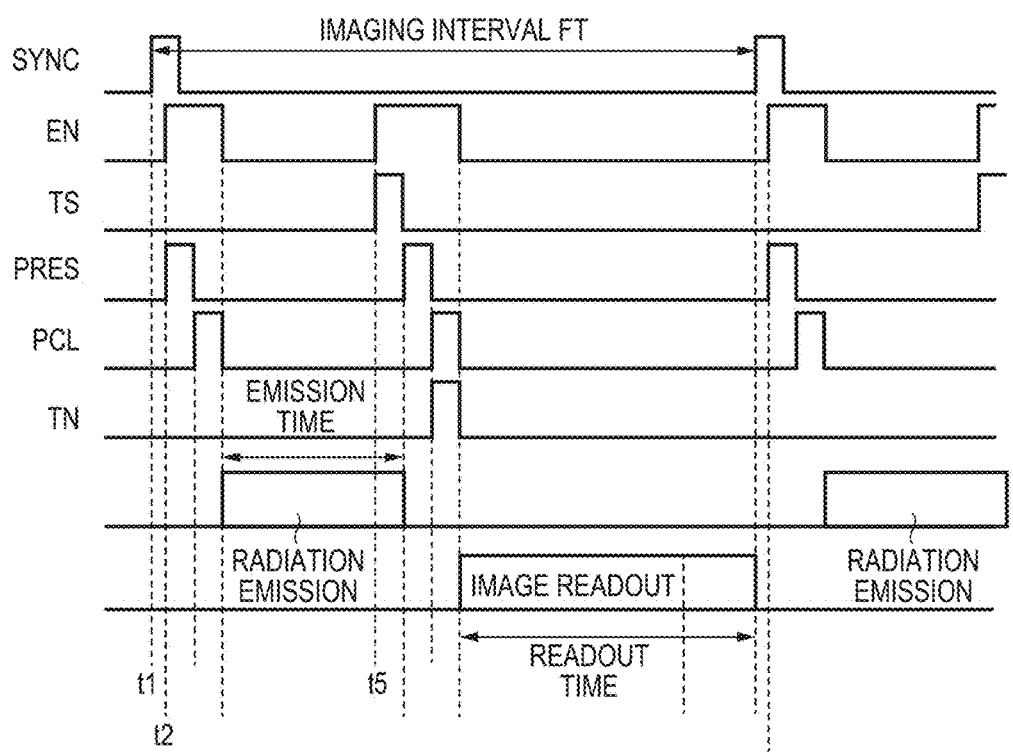
FIG. 23 is a timing chart showing sampling operation at the time of moving image capturing according to the sixth embodiment.

The sixth embodiment will be described next. In the pixel circuit shown in FIG. 2, the voltage level at which an analog signal output to analog output terminals S and N represents optical black corresponds to the voltage to be output upon undergoing a voltage drop through a pixel amplifier M10 or M13, a vertical scanning circuit 303, and a horizontal scanning circuit 304. Note that the reference voltage VCL is also called a clamp voltage. The following will describe, with reference to FIGS. 21 to 23, a method of correcting offset variations due to 1/f noise generated in various types of semiconductor devices, which is performed in the sixth embodiment, in sampling operation when capturing a moving image by intermittently irradiating an object with radiation in the form of pulses. FIG. 21 is a block diagram showing an image sensor driving circuit according to the sixth embodiment. FIG. 22 is a flowchart showing control on rectangular semiconductor substrates 106 according to the sixth embodiment. FIG. 23 is a timing chart showing sampling operation at the time of moving image capturing according to the sixth embodiment.

First of all, an imaging control unit 109 of a radiation imaging apparatus 100 starts operation upon setting of an imaging mode by a system control apparatus 101 (step S401). This imaging mode includes a frame rate indicating imaging intervals FT, an accumulation time for the accumulation of radiation, and size information of an output image.

The imaging control unit 109 then performs data generating operation to obtain a target value at the time of offset correction before imaging operation (step S402). This data generating operation will be described with reference to FIG. 21. FIG. 21 is a schematic block diagram showing a sensor signal processing circuit in the sixth embodiment. Referring to FIG. 21, an analog multiplexer 131 outputs one each of signals S and N from the four tiled rectangular semiconductor substrates 106 based on an instruction from the imaging control unit 109. In this case, it is possible to use a 2-input/2-output differential amplifier 141 and a 2-input/1-output A/D converter 151 although it is possible to use a 2-input/1-output differential amplifier and a 1-input/1-output A/D converter 151 as in the case of the arrangement exemplified by the above embodiment (FIG. 1). The 2-input/2-output differential amplifier outputs two output signals upon amplifying the difference between two input signals input thereto with a specific magnification. The difference value between the two output signals output from the amplifier is the value obtained by amplifying the difference value between the input signals with the specific magnification. Such two output signals are input to the A/D converter. The A/D converter outputs the difference value as a digital value. Assume that such a 2-output differential amplifier and 2-input A/D converter are used. In this case, even if noise is superimposed on input/output signals of the amplifier, similar noise is superimposed on each input signal or each output signal. This reduces the influence of noise on the difference value of the two signals. Since the 2-input A/D converter can obtain a digital signal based on such two signals, it is possible to suppress signal variations due to noise. Referring to FIG. 21, the following offset correction circuit is added to this block.

The offset correction circuit includes
multiplexers 421 and 451 which select either output signals from the analog multiplexer 131, a reference voltage signal Vref having almost the same voltage level as that at which a pixel signal represents optical black, and signals from a D/A converter 441, a D/A converter 411 which converts the offset correction data calculated by the imaging control unit 109 into an analog signal, an amplifier 401 which amplifies ara analog output signal D/A converter 411, and an addition circuit 431 which adds an output signal from the amplifier 40 to an output signal from the multiplexer 451.

In order to generate a target value for offset correction, first of all, the imaging control unit 109 performs control to make the multiplexer 421 output the reference voltage signal Vref. When the multiplexer 421 starts to output the reference voltage signal Vref, the imaging control unit 109 samples N data output from the A/D converter 151, and calculates a sum ΣDTn of N target value data DTn in advance. Since the reference voltage signal Vref has almost the same voltage level as that at which a pixel signal represents optical black, it is possible to shorten the time until the voltage become stable when the multiplexer 421 is switched. This makes it possible to perform sampling immediately after switching and increase the frame rate. In addition, since voltage variations at the time of switching can be reduced, it is possible to reduce radiation noise due to voltage variations. Since the voltage level at which a pixel signal represents optical black varies in accordance with each rectangular semiconductor substrate, the reference voltage signal Vref may be set to a voltage having an average value of voltage levels at which pixel signals represent optical black on the respective rectangular semiconductor substrates.

Sampled data are normally distributed as indicated by histogram A in FIG. 17 due to the noise generated in the multiplexer 421, a differential amplifier 141, and the A/D converter 151. It is therefore known that the larger the sampling count, the higher the accuracy of the average value will be in terms of statistics. For this reason, the apparatus may sample data by an integer M multiple of the number N and obtain a target value by dividing the sum by M.

The imaging control unit 109 then detects a synchronization signal for the first image input from the system control apparatus 101 (step S403). Upon receiving a first synchronization signal SYNC from the system control apparatus 101 at time t1 in FIG. 23, the imaging control unit 109 performs reset driving from time t2 to start accumulating charge corresponding to radiation (step S404). Reset driving is the same as that in the first embodiment. Upon performing reset driving, the imaging control unit 109 starts accumulation in a photodiode PD, thereby activating the emission of radiation.

The apparatus irradiates an object with radiation in the form of pulses for a predetermined period of time. In order to terminate the accumulation after the lapse of a time corresponding to the irradiation time, the imaging control unit 109 sets a signal EN at high level to start sampling driving at time t5 (step S405). Sampling driving is the same as that in the first embodiment.

The following will describe the operation of acquiring data for offset correction while sequentially outputting voltages sampled and held in capacitors CS and CN by scanning vertical and horizontal shift registers. First of all, the imaging control unit 109 selects the reference voltage signal Vref as an input to each of the multiplexers 421 and 451 by using SEL1 and SEL2 (step S406). Selecting the reference voltage signal Vref can measure 1/f noise generated in the multiplexers 421 and 451, the differential amplifier 141, and the A/D converter 151 as a variation from a target value.

The imaging control unit 109 then samples a predetermined number N of output data DOn from the A/D converter 151 and obtains sum=ΣDOn of the data (step S407). The predetermined number N is equal to the sampling count when target value A is obtained. In this case, the N sampled data are normally distributed as indicated by histogram B in FIG. 17. Therefore, the difference C between the average value of the distribution indicated by histogram B and the average value of the distribution indicated by histogram A becomes an offset amount to be corrected.

The imaging control unit 109 then subtracts ΣDOn from the sum ΣDTn as the target value obtained in step S402, and divides the difference by the sampling count N, thereby obtaining a correction value (step S408). The obtained correction value represents a variation from the target value. The imaging control unit 109 outputs the obtained correction value to the D/A converter 411 (step S408). Although the output correction value is digital data, each D/A converter 411 converts the data into an analog signal, and performs predetermined analog signal processing via the amplifier 401. The addition circuit 431 adds this signal to an output signal from the multiplexer 451 to correct the offset. If, for example, 1/f noise is generated to increase the offset, the measured value ΣDOn becomes larger than the target value ΣDTn. For this reason, the result obtained in step S408 becomes negative. Finally, the value is applied in a direction to decrease the offset superimposed on the output signal from the multiplexer 451.

Subsequently, the imaging control unit 109 selects the analog multiplexer 131 by using SEL1 and SEL2, sets VST at "H" for the first row, and makes CLKV rise (step S409).

When CLKV rises, the internal circuit of the vertical scanning circuit 303 (FIG. 4) is reset to output "H" to an output V0 of the vertical scanning circuit 303 to select one line controlled by the row signal line 305 to activate a pixel output. Subsequently, when CLKH rises while HST is set at "H", the internal circuit of the horizontal scanning circuit 304 is reset to output "H" to an output H1 of the horizontal scanning circuit 304. With this operation, a pixel circuit 302 selected by H1 of the pixels on one line activated by the row signal line 305 outputs an output to the analog output terminal. When pulses CLKH are sequentially input, the "H" output of the horizontal scanning circuit 304 sequentially shifts to H1, H2, . . . , Hn, thereby completing 1-line readout operation. The imaging control unit 109 switches the outputs of the rectangular semiconductor substrates connected to the analog multiplexer 131 by sequentially setting CS0 to CS3 at "H", as shown in FIGS. 5A and 5B, thereby performing pixel data readout operation (step S410).

In addition, the imaging control unit 109 determines whether the current line is the last line (step S411). If the imaging control unit 109 determines that the current line is the last line, the process advances to step S412. In this case, since the current line is the first line, the process returns from step S411 to step S406 to perform offset correcting operation for the next line and pixel data readout operation. Repeating these operations will read out pixel data from the rectangular semiconductor substrates 106. When the process reaches the last line, the imaging control unit 109 checks whether to terminate the imaging operation (step S412). If the imaging control unit 109 determines not to terminate the imaging operation, the process returns to step S403 to wait for a synchronization signal to continuously perform imaging operation for the next image. In contrast to this, if the imaging control unit 109 determines to terminate the imaging operation, the imaging control unit 109 terminates the imaging operation.

Although the sixth embodiment is configured to perform control to make the multiplexer 421 output the reference voltage signal Vref at the time of offset correction, the present invention is not limited to this. For example, if the voltage levels at which pixel signals from the respective rectangular semiconductor substrates 106 represent optical black greatly differ from each other due to individual differences, common Vref will increase errors. For this reason, the multiplexer 421 may be configured to select the D/A converter 441 to output a voltage corresponding to the voltage level at which a pixel signal from each rectangular semiconductor substrate 106 represents optical black at the time of offset correction.

In this case, as the voltage level at which a pixel signal from each rectangular semiconductor substrate 106 represents optical black, the voltage level at which a pixel signal from each rectangular semiconductor substrate 106 represents optical black is measured at the assembly stage in the factory and stored in a nonvolatile memory (not shown) in the imaging control unit 109. The memory stores the voltage level corresponding to black for each rectangular semiconductor substrate. At the time of data sampling for the generation of target and correction values for offset correction, a voltage level corresponding to black corresponding to a rectangular semiconductor substrate from which an image signal is to be acquired is read out from the memory. The D/A converter 441 converts this data into an analog signal to set it as a reference voltage signal. Note that the voltage level corresponding to black changes as CS0 to CS3 are switched. The multiplexer 421 then sets SEL1 and SEL2 so as to select an output from the D/A converter 441. When always using an output from the D/A converter 441, it is possible to omit the arrangement configured to select the reference voltage signal Vref by using the multiplexers 421 and 451. In the above case, the voltage levels corresponding to black are switched for each rectangular semiconductor substrate. However, they may be switched for each D/A converter. In this case, the memory holds, as a reference voltage, the average of voltage levels corresponding to black on the plurality of rectangular semiconductor substrates connected to the analog multiplexer 131.

With these operations, it is possible to perform offset operation with voltages closer to the voltage levels at which pixel signals from the respective rectangular semiconductor substrates 106 represent optical black. This makes it possible to shorten the time until the voltage becomes stable when the multiplexer 421 is switched. It is therefore possible to perform sampling immediately after switching operation, thereby increasing the frame rate. In addition, it is possible to reduce the generation of radiation noise due to voltage variations because voltage variations at the time of switching can be reduced.

Furthermore, the sixth embodiment is configured to sequentially select three or four rectangular semiconductor substrates 106 by using the analog multiplexer 131. However, the present invention is not limited to this. For example, the analog multiplexer may be configured to select five or more rectangular semiconductor substrates 106. Alternatively, one rectangular semiconductor substrate 106 may be constituted by one each of a differential amplifier, A/D converter, and offset correction circuit. This arrangement can reduce 1/f noise even in a moving image of a high frame rate.

Note that the setting of the reference voltage signal Vref or a reference voltage signal using the D/A converter 441 in the sixth embodiment can also be applied to the first to third embodiments and the fifth embodiment.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2012-170381 filed Jul. 31, 2012, which is hereby incorporated by reference herein in its entirety, and claims benefit of parent Ser. No. 13/948,699, filed Jul. 23, 2013, the entire contents of which also are incorporated herein by reference.

What is claimed is:

1. An imaging apparatus comprising:
a plurality of pixel circuits that are two dimensionally arrayed, each of which outputs an analog signal corresponding to radiation;
a control unit configured to control scanning of the plurality of pixel circuits, to read out the analog signal from each of the plurality of pixel circuits;
a circuit configured to output image data corresponding to the analog signal read out from each of the plurality of pixel circuits and to output a reference signal value corresponding to an analog reference signal, in order to obtain a target value; and
a correction circuit configured to correct the analog signal read out from each of the plurality of pixel circuits, wherein
the correction circuit corrects the signal read out from each of the plurality of pixel circuits by supplying to the circuit an analog correction value signal to be added to the analog signal, the analog correction value signal is variation from the target value obtained based on the reference signal value output from the circuit prior to execution of the control by the control unit.

2. The apparatus according to claim 1, wherein the circuit outputs N reference signal values prior to execution of the control by the control unit, and
the correction circuit corrects the analog signal by providing the circuit with the correction value signal which is obtained based on the N reference signal values.

3. The apparatus according to claim 2, wherein the circuit outputs M reference signal values in an interval after the control unit completes scanning a plurality of pixel circuits on a certain one line before the control unit starts scanning a plurality of pixel circuits on a next line, and
the correction circuit corrects the analog signal by providing the circuit with the analog correction value signal which is obtained based on the N reference values and M reference values.

4. The apparatus according to claim 3, wherein the correction circuit further comprises an amplifier having attenuation rate 1/M, and supplies the analog correction value signal obtained based on the M reference signal values to the circuit through the amplifier.

5. The apparatus according to claim 3, wherein the correction circuit corrects the analog signal by providing the circuit with the analog correction value signal obtained based on: the target value obtained based on N reference signal values obtained from the circuit before detection of a synchronizing signal indicating start of the control; N reference signal values obtained from the circuit after detection of the synchronizing signal; and the M reference values, wherein the number N is integer multiple of the number M.

6. The apparatus according to claim 5, wherein the correction circuit corrects the analog signal by providing the circuit with the analog correction value signal that is obtained based on a value obtained by dividing a sum of the N reference signal values with N and a value obtained by dividing a sum of the M reference signal values with M.

7. The apparatus according to claim 5, wherein the correction circuit corrects the analog signal by providing the circuit with the analog correction value signal obtained by applying a recursive processing to the M reference signal values.

8. The apparatus according to claim 5, wherein the control unit sets the target value in accordance with a set imaging mode, and
the apparatus further comprises a storage unit configured to store the target value and the set imaging mode in association with each other.

9. The apparatus according to claim 1, wherein each of the plurality of pixel circuits includes: a photodiode unit, and a switch and a capacitor configured to sample and hold the electric signal from the photodiode, which corresponds to a voltage corresponding to the radiation.

10. The apparatus according to claim 9, wherein the analog reference signal is based on analog signals output from the plurality of pixel circuits based on a constant voltage supplied to the capacitor.

11. The apparatus according to claim 10, wherein each of the plurality of pixel circuits comprises: a first pixel amplifier connected between the photodiode unit and the switch; a second pixel amplifier connected between the first pixel amplifier and the switch; and a clamping circuit connected between the first pixel amplifier and the second pixel amplifier, and
the analog reference signal is based on an analog signal output from the plurality of pixel circuits based on the constant voltage supplied to the clamping circuit.

12. The apparatus according to claim 1, wherein the analog reference signal is supplied to the circuit through a multiplexer for causing the circuit to input the analog signal or the analog reference signal.

13. The apparatus according to claim 1, wherein the plurality of pixel circuits includes a group of pixel circuits light-shielded by a light-shielding portion, and
the reference analog signal is based on a signal output from the group of pixel circuits.

14. The apparatus according to claim 1, wherein the circuit comprises an A/D convertor which outputs the image data obtained by A/D converting the analog signal or outputs the reference value signal obtained by A/D converting the analog reference signal, and
the correction circuit comprises a D/A convertor that applies the analog correction value signal, which has been obtained based on the reference signal value and has been D/A converted, to an input of the A/D converter.

15. The apparatus according to claim 14, wherein the circuit includes a plurality of the A/D converters, and
the correction circuit comprises a plurality of the D/A convertors corresponding to the plurality of the A/D convertors.

16. The apparatus according to claim 14, wherein the plurality of pixel circuits are equipped on each of a plurality of semiconductor substrates, and
the plurality of A/D converters are arranged corresponding to the plurality of semiconductor substrates.

17. The apparatus according to claim 1, wherein the circuit outputs the N reference signal values at a predetermined time interval prior to execution of the control by the control unit, and
the correction circuit corrects the analog signal by providing the circuit with the analog correction value signal that has been obtained based on the target value obtained by using N reference signal values obtained from the circuit before detection of a synchronizing signal indicating start of the control and N reference signal values obtained from the circuit after detection of the synchronizing signal.

18. The apparatus according to claim 1, further comprising a radiation source that emits radiation to the plurality of pixel circuits.

* * * * *